US012451665B2

(12) United States Patent
Kaji et al.

(10) Patent No.: US 12,451,665 B2
(45) Date of Patent: Oct. 21, 2025

(54) SEMICONDUCTOR LASER DRIVING APPARATUS, ELECTRONIC EQUIPMENT, AND MANUFACTURING METHOD OF SEMICONDUCTOR LASER DRIVING APPARATUS

(71) Applicant: SONY SEMICONDUCTOR SOLUTIONS CORPORATION, Kanagawa (JP)

(72) Inventors: Nobuaki Kaji, Kanagawa (JP); Hirohisa Yasukawa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 879 days.

(21) Appl. No.: 17/641,258

(22) PCT Filed: Jul. 20, 2020

(86) PCT No.: PCT/JP2020/028022
§ 371 (c)(1),
(2) Date: Mar. 8, 2022

(87) PCT Pub. No.: WO2021/053962
PCT Pub. Date: Mar. 25, 2021

(65) Prior Publication Data
US 2022/0285908 A1 Sep. 8, 2022

(30) Foreign Application Priority Data
Sep. 17, 2019 (JP) .................................. 2019-168251

(51) Int. Cl.
*H01S 5/02345* (2021.01)
*H01S 5/00* (2006.01)
(Continued)

(52) U.S. Cl.
CPC ........ *H01S 5/02345* (2021.01); *H01S 5/0014* (2013.01); *H01S 5/0239* (2021.01);
(Continued)

(58) Field of Classification Search
CPC ............... H01S 5/02345; H01S 5/0239; H01S 5/06804; H01S 5/0617
See application file for complete search history.

(56) References Cited

U.S. PATENT DOCUMENTS

| 6,181,718 | B1 | 1/2001 | Kobayashi |
| 2005/0158058 | A1 | 7/2005 | Bae et al. |

(Continued)

FOREIGN PATENT DOCUMENTS

| CN | 202423821 | 9/2012 |
| JP | H05327617 A | 12/1993 |

(Continued)

OTHER PUBLICATIONS

International Search Report prepared by the Japan Patent Office on Sep. 9, 2020, for International Application No. PCT/JP2020/028022, 3 pgs.

*Primary Examiner* — Michael Carter
(74) *Attorney, Agent, or Firm* — Sheridan Ross PC

(57) ABSTRACT

To reduce the wiring inductance between a semiconductor laser and a laser driver in a semiconductor laser driving apparatus. A substrate incorporates a laser driver. A semiconductor laser is mounted on one surface of the substrate of a semiconductor laser driving apparatus to emit irradiation light from an irradiation surface. Connection wiring electrically connects the laser driver and the semiconductor laser to each other with a wiring inductance of 0.5 nanohenries or less. A temperature sensor measures a temperature relating to the semiconductor laser. A memory stores control data
(Continued)

from the laser driver to the semiconductor laser in a manner corresponding to the temperature.

14 Claims, 25 Drawing Sheets

(51) Int. Cl.
*H01S 5/0239* (2021.01)
*H01S 5/026* (2006.01)
*H01S 5/06* (2006.01)
*H01S 5/068* (2006.01)

(52) U.S. Cl.
CPC .......... *H01S 5/0261* (2013.01); *H01S 5/0262* (2013.01); *H01S 5/0617* (2013.01); *H01S 5/06804* (2013.01)

(56) References Cited

U.S. PATENT DOCUMENTS

2016/0218219 A1* 7/2016 Asami ............... H01L 21/47573
2017/0302054 A1    10/2017 Wanke

FOREIGN PATENT DOCUMENTS

| JP | H11-186668 | | 7/1999 |
| JP | 2002-232062 | * | 8/2002 |
| JP | 2004-126108 | | 4/2004 |
| JP | 2005-203784 | | 7/2005 |
| JP | 2009-049031 | | 3/2009 |
| JP | 2009-170675 | | 7/2009 |

* cited by examiner

FIG.7

| TEMPERATURE | SEMICONDUCTOR LASER OUTPUT POWER | | |
|---|---|---|---|
| | 1W | 2W | 3W |
| 20°C | 1.0A | 2.0A | 3.0A |
| 30°C | 1.5A | 2.5A | 3.5A |
| 40°C | 2.0A | 3.0A | 4.0A |

FIG.8
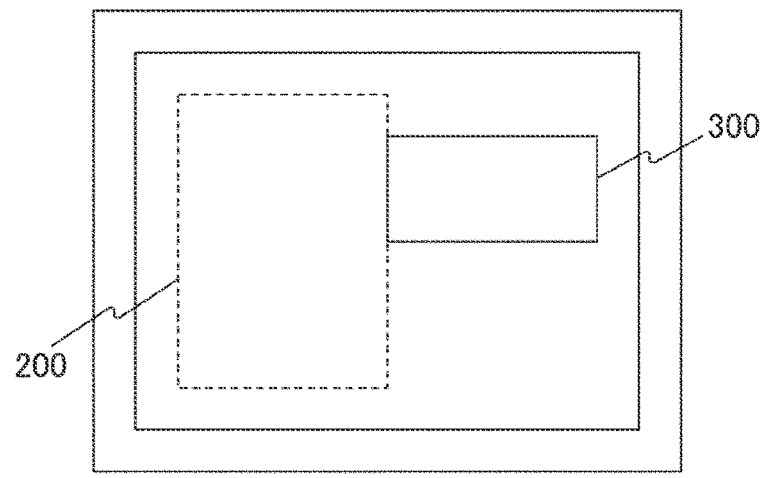
a  OVERLAP: 0%
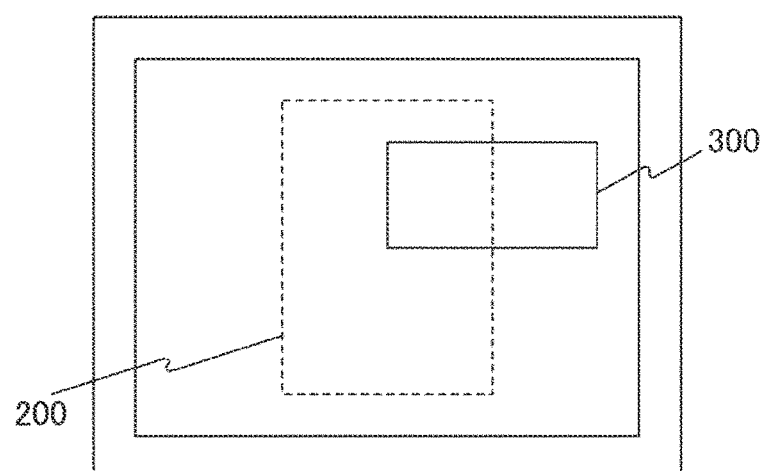
b  OVERLAP: 50%
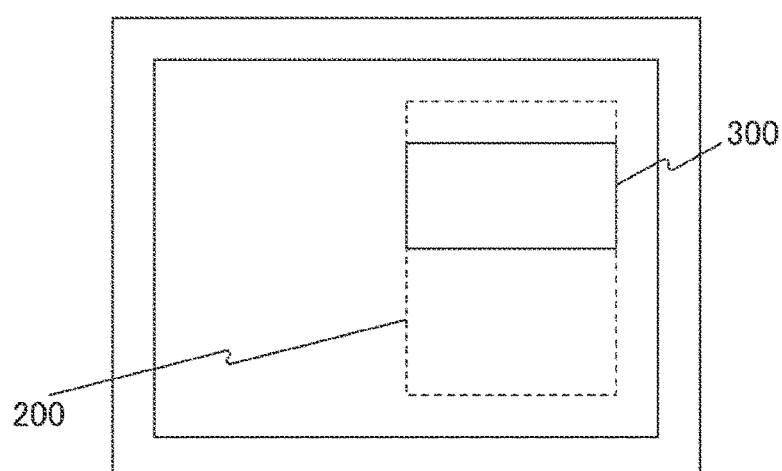
c  OVERLAP: 100%

FIG.9

ADDITIVE METHOD (H=15μm)

| | | L | | | | |
|---|---|---|---|---|---|---|
| | | 0.3mm | 0.5mm | 1mm | 2mm | 3mm |
| W | 0.015mm | 0.21 | 0.40 | 0.94 | 2.16 | 3.48 |
| | 0.05mm | 0.16 | 0.33 | 0.79 | 1.85 | 3.02 |
| | 0.1mm | 0.13 | 0.27 | 0.68 | 1.63 | 2.69 |
| | 0.2mm | 0.09 | 0.21 | 0.56 | 1.39 | 2.33 |
| | 0.3mm | 0.07 | 0.17 | 0.48 | 1.24 | 2.11 |

FIG.10

SUBTRACTIVE METHOD (H=35μm)

|  |  | L | | | | |
|---|---|---|---|---|---|---|
|  |  | 0.3mm | 0.5mm | 1mm | 2mm | 3mm |
| W | 0.035mm | 0.16 | 0.32 | 0.77 | 1.82 | 2.98 |
|  | 0.05mm | 0.15 | 0.30 | 0.73 | 1.75 | 2.86 |
|  | 0.1mm | 0.12 | 0.25 | 0.65 | 1.57 | 2.59 |
|  | 0.2mm | 0.09 | 0.20 | 0.54 | 1.35 | 2.27 |
|  | 0.3mm | 0.07 | 0.17 | 0.47 | 1.22 | 2.07 |

FIG.11
a
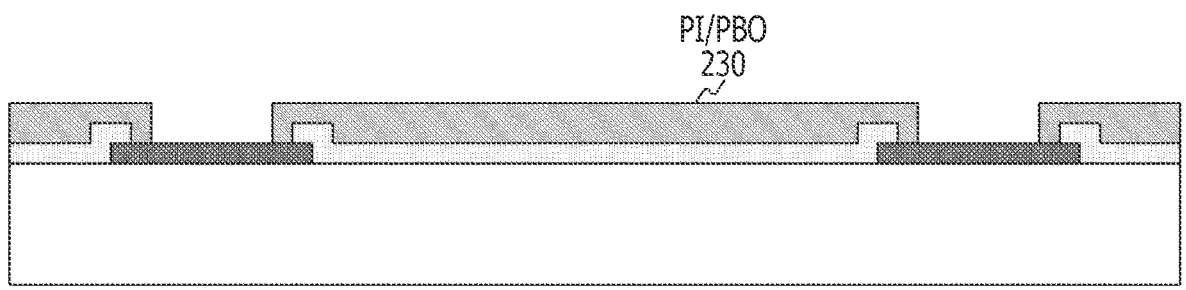
b
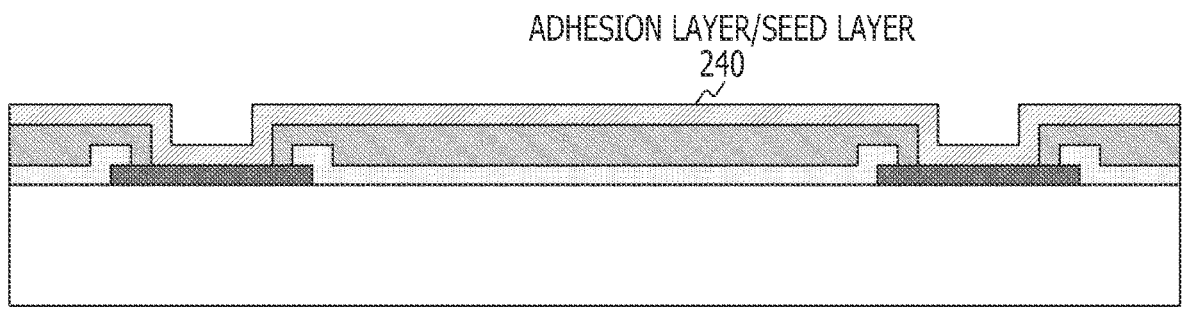
c

FIG. 12
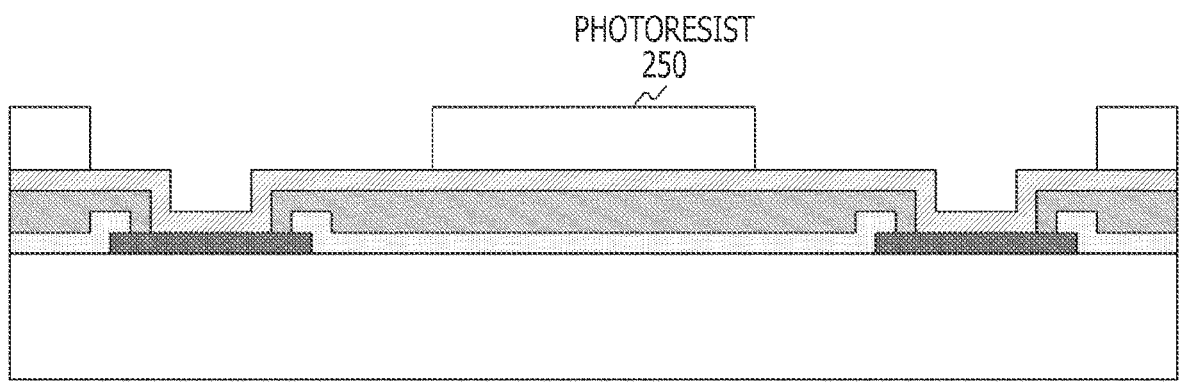
d
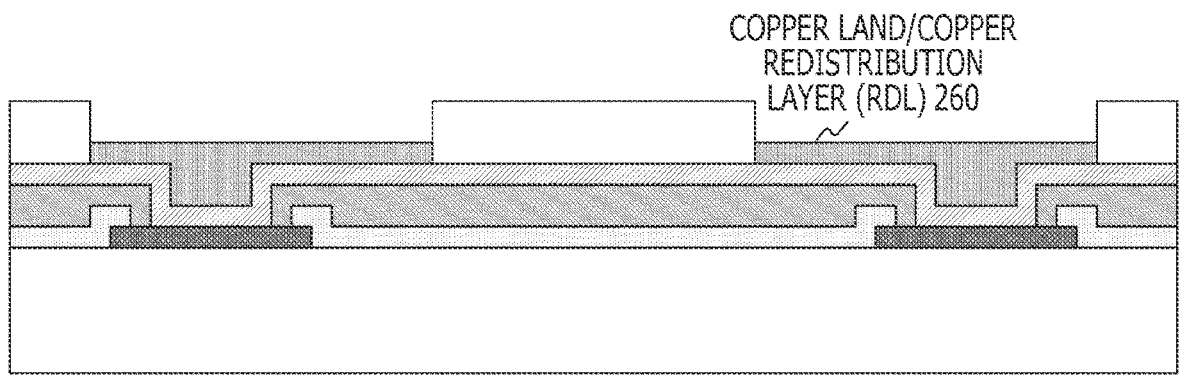
e
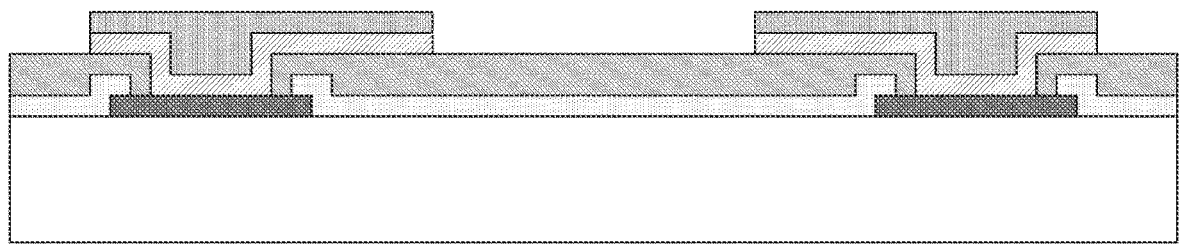
f

FIG.14
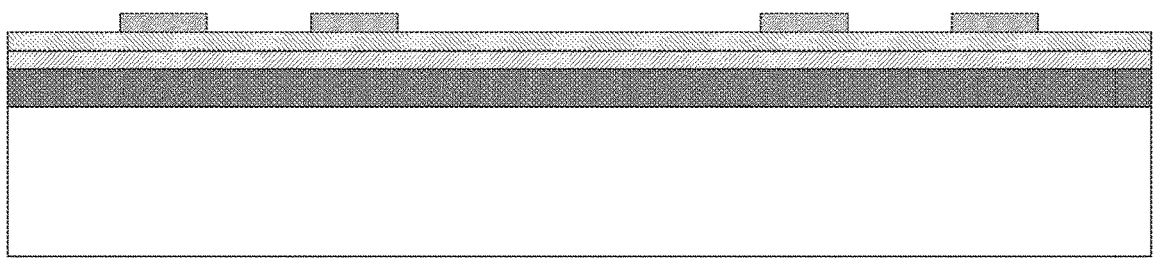
e
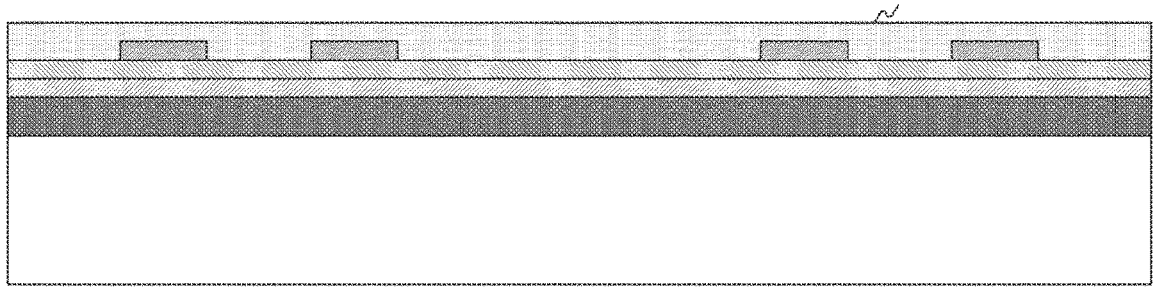
INTERLAYER INSULATING RESIN 161
f
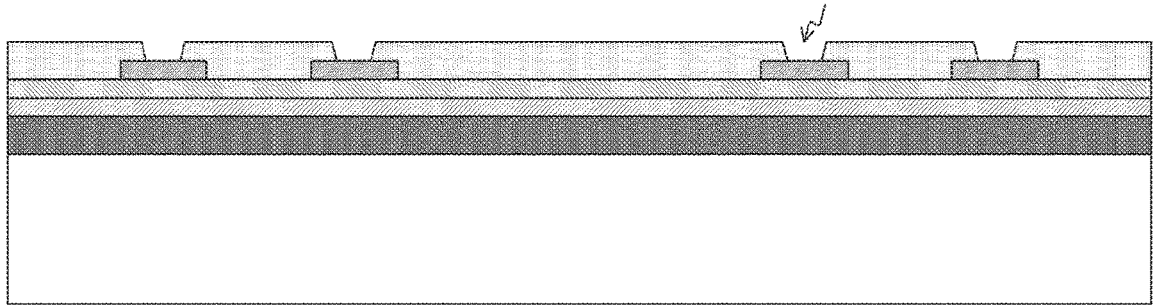
VIA HOLE 170
g
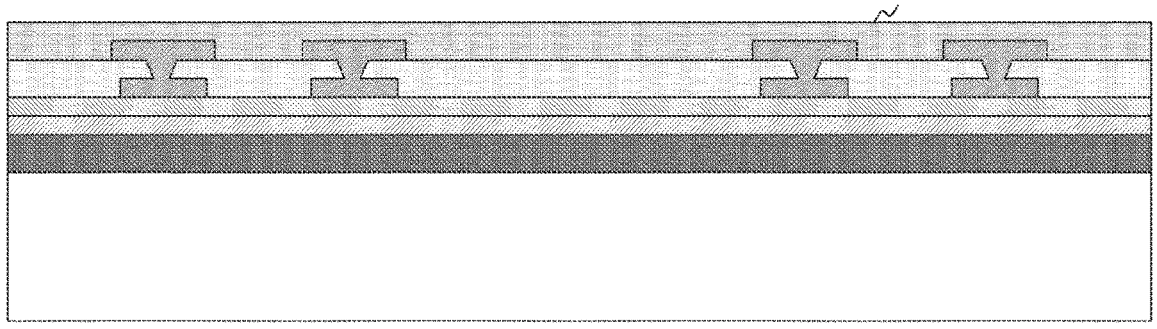
INTERLAYER INSULATING RESIN 162
h FIG.16
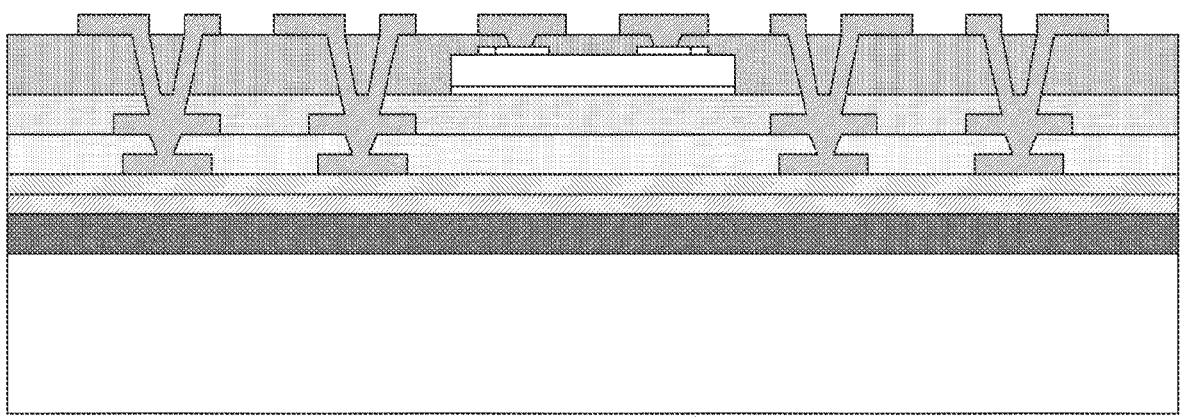
l
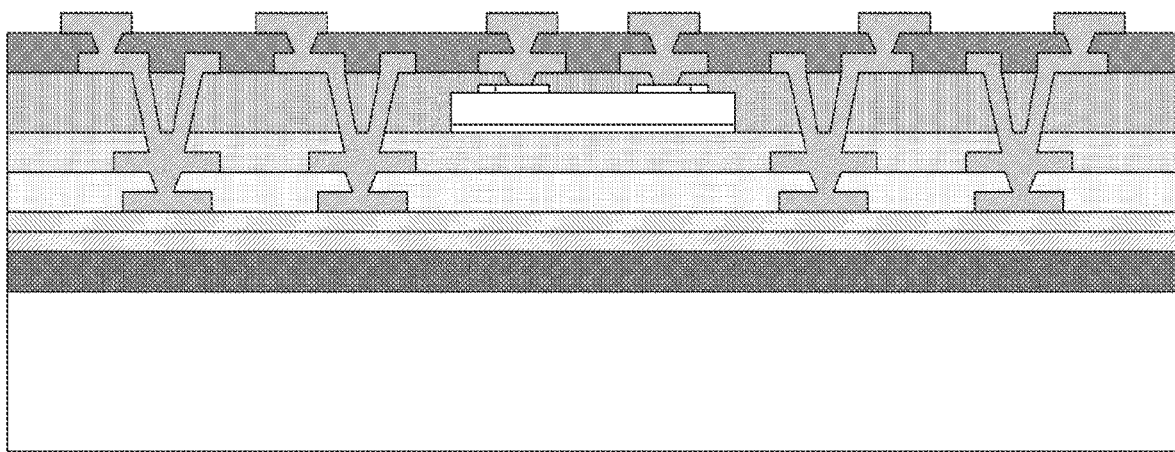
m
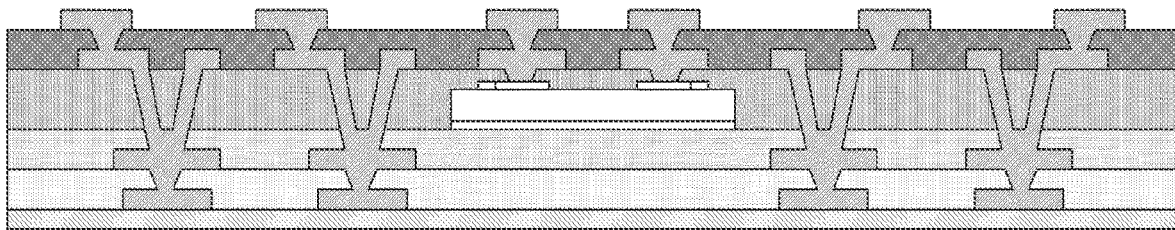
n FIG.17
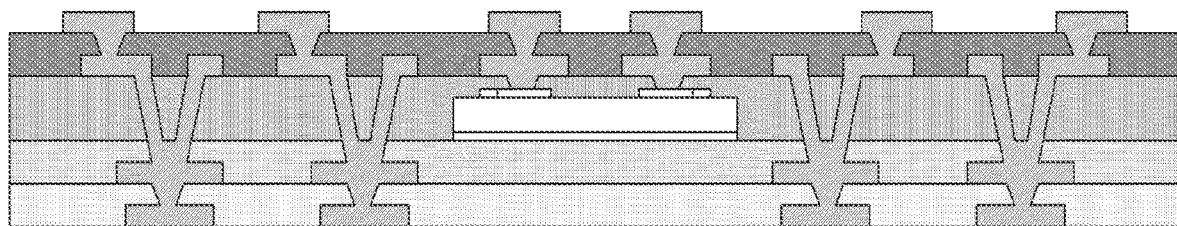
o
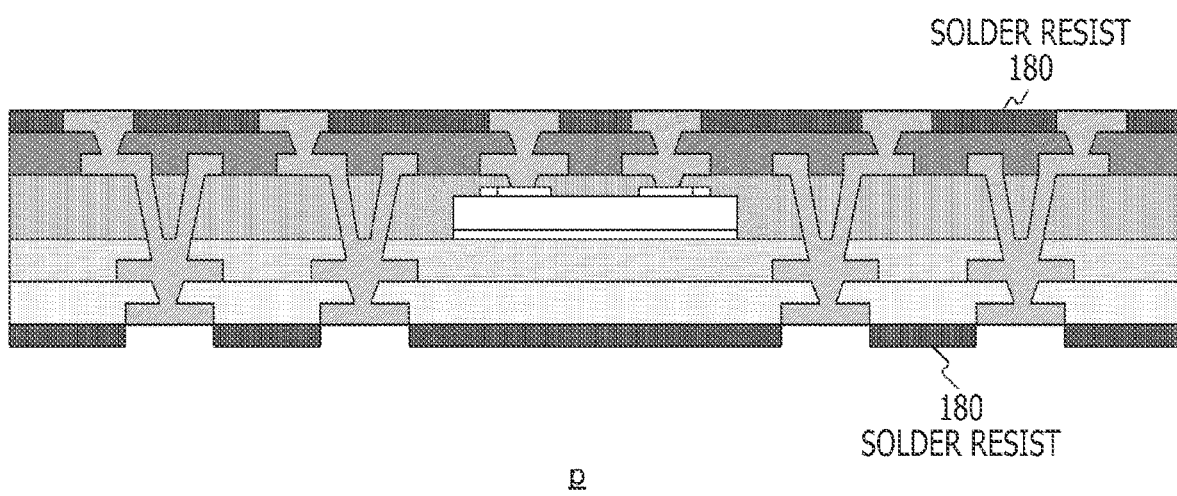

FIG.23
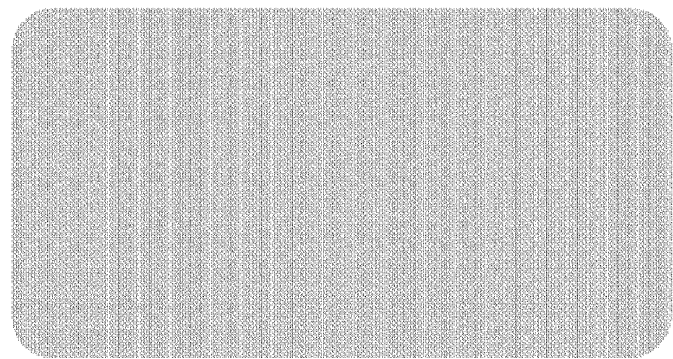
a
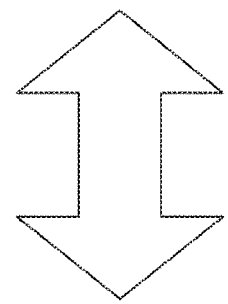
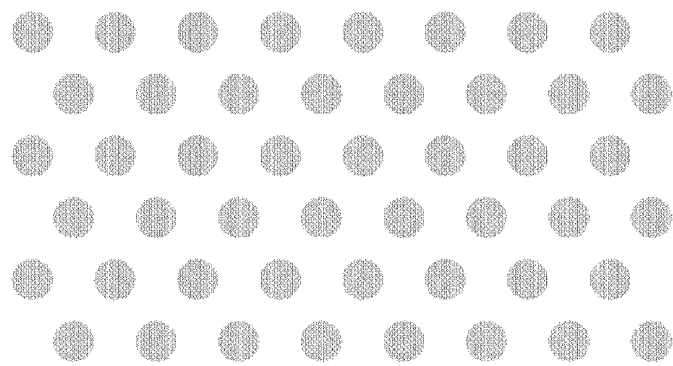
b

SEMICONDUCTOR LASER DRIVING APPARATUS, ELECTRONIC EQUIPMENT, AND MANUFACTURING METHOD OF SEMICONDUCTOR LASER DRIVING APPARATUS

CROSS REFERENCE TO RELATED APPLICATIONS

This application is a national stage application under 35 U.S.C. 371 and claims the benefit of PCT Application No. PCT/JP2020/028022, having an international filing date of 20 Jul. 2020, which designated the United States, which PCT application claimed the benefit of Japanese Patent Application No. 2019-168251, filed 17 Sep. 2019, the entire disclosures of each of which are incorporated herein by reference.

TECHNICAL FIELD

The present technique relates to a semiconductor laser driving apparatus. Specifically, the present technique relates to a semiconductor laser driving apparatus and electronic equipment including a substrate incorporating a laser driver and a semiconductor laser and a manufacturing method of the semiconductor laser driving apparatus.

BACKGROUND ART

In an electronic apparatus having a distance measurement function, a distance measurement system called ToF (Time of Flight) has often been used from the past. ToF is a system in which a light emitting unit irradiates an object with irradiation light of a sine wave or a rectangular wave, a light receiving unit receives the reflected light from the object, and a distance measurement computing unit measures a distance on the basis of a phase difference between the irradiation light and the reflected light. In order to realize such a distance measurement function, there is known an optical module in which a light emitting element and an electronic semiconductor chip for driving the light emitting element are housed in a case and integrated. For example, an optical module that includes a laser diode array mounted in alignment on an electrode pattern of a substrate and a driver IC electrically connected to the laser diode array has been proposed (refer to, for example, PTL 1).

CITATION LIST

Patent Literature

[PTL 1]
Japanese Patent Laid-open No. 2009-170675

SUMMARY

Technical Problem

In the related art described above, the laser diode array and the driver IC are integrated and configured as an optical module. However, in the related art, the laser diode array and the driver IC are electrically connected to each other by a plurality of wires, the wiring inductance therebetween becomes large, and there is a risk that the drive waveform of the semiconductor laser is distorted. This is particularly problematic for ToF driven at hundreds of megahertz.

The present technique has been developed in view of such a situation, and an object thereof is to reduce a wiring inductance between a semiconductor laser and a laser driver in a semiconductor laser driving apparatus.

Solution to Problem

The present technique has been made in order to solve the above-described problem, and a first aspect thereof is to provide a semiconductor laser driving apparatus and electronic equipment including the semiconductor laser driving apparatus, the semiconductor laser driving apparatus including a substrate incorporating a laser driver, a semiconductor laser mounted on one surface of the substrate to emit irradiation light from an irradiation surface, connection wiring that electrically connects the laser driver and the semiconductor laser to each other with a wiring inductance of 0.5 nanohenries or less, a temperature sensor for measuring a temperature relating to the semiconductor laser, and a memory for storing control data from the laser driver to the semiconductor laser in a manner corresponding to the temperature. This leads to an effect of electrically connecting the laser driver and the semiconductor laser to each other with a wiring inductance of 0.5 nanohenries or less and storing the control data for each temperature of the semiconductor laser.

In addition, in the first aspect, the memory may store, as the control data, a drive current for outputting predetermined laser power in the semiconductor laser, and the laser driver may read the corresponding drive current from the memory on the basis of the temperature measured by the temperature sensor, and output the read drive current to the semiconductor laser. This leads to an effect of outputting the drive current based on the measured temperature to the semiconductor laser.

In addition, in the first aspect, an outer wall surrounding a region including the semiconductor laser on the one surface of the substrate, a diffusion plate covering an upper part of the region surrounded by the outer wall, and a photodiode that is mounted on the one surface of the substrate and monitors light intensity of laser light emitted from the semiconductor laser are further provided, the memory may store an expected value of a ratio of the laser power to the light intensity, as the control data, and the laser driver may read the corresponding expected value from the memory, on the basis of the temperature measured by the temperature sensor and control the semiconductor laser according to a relation between the ratio of the laser power to the light intensity and the read expected value. This leads to an effect of controlling the semiconductor laser according to the ratio of the laser power to the light intensity detected by the photodiode.

In addition, in the first aspect, in the case where the ratio of the laser power to the light intensity does not satisfy a predetermined range based on the read expected value, the laser driver may control the semiconductor laser such that the laser power increases. This leads to an effect of controlling the semiconductor laser such that the laser power increases in association with the deterioration of the semiconductor laser or the like.

In addition, in the first aspect, in the case where the ratio of the laser power to the light intensity does not satisfy a predetermined range based on the read expected value, the laser driver may perform control to stop the semiconductor laser. This leads to an effect of stopping the semiconductor laser in the case where there is a risk that the safety standard of the laser is not satisfied.

In addition, in the first aspect, the memory may be mounted on one surface of the substrate. Moreover, the memory may be incorporated in the substrate. Furthermore, the memory may be mounted inside the laser driver. This leads to an effect of improving the utilization efficiency of the surface of the substrate and thereby reducing the size of the substrate.

In addition, in the first aspect, a first optical element provided on the irradiation surface side of the semiconductor laser and a second optical element provided outside the first optical element on the irradiation surface side of the semiconductor laser are further provided, the semiconductor laser may be first and second semiconductor lasers, the first optical element may be an optical element that allows irradiation light from the first semiconductor laser to pass therethrough and makes irradiation light from the second semiconductor laser into parallel light, the second optical element may be a diffusion element that refracts light having passed through the first optical element and a diffraction element that diffracts the parallel light from the first optical element, and the memory may store control data from the laser driver to the first and second semiconductor lasers in a manner corresponding to the temperature. This leads to an effect of performing uniform irradiation and spot irradiation via the first and second optical elements.

In addition, in the first aspect, it is desirable that the connection wiring have a length of 0.5 millimeters or less. In addition, it is more preferable that the connection wiring be 0.3 millimeters or less.

In addition, in the first aspect, the connection wiring may be provided via a connection via provided in the substrate. This leads to an effect of shortening the wiring length.

In addition, in the first aspect, the semiconductor laser may be arranged in such a manner that a part thereof overlaps an upper part of the laser driver. In this case, the semiconductor laser may be arranged in such a manner that a part corresponding to 50% or less of the area thereof overlaps the upper part of the laser driver.

In addition, a second aspect of the present technique is to provide a manufacturing method of a semiconductor laser driving apparatus, the manufacturing method including a step of forming a laser driver on an upper surface of a support plate, a step of forming a substrate incorporating the laser driver, by forming connection wiring of the laser driver, a step of mounting a semiconductor laser on one surface of the substrate and forming connection wiring that electrically connects the laser driver and the semiconductor laser to each other via the connection wiring with a wiring inductance of 0.5 nanohenries or less, a step of mounting a temperature sensor for measuring a temperature relating to the semiconductor laser, and a step of mounting a memory for storing control data from the laser driver to the semiconductor laser in a manner corresponding to the temperature. This leads to an effect of electrically connecting the laser driver and the semiconductor laser to each other with a wiring inductance of 0.5 nanohenries or less and manufacturing a semiconductor laser driving apparatus that stores the control data for each temperature of the semiconductor laser.

BRIEF DESCRIPTION OF DRAWINGS

FIG. 7 is a diagram for illustrating an example of control data stored in a setting memory 109 according to the first embodiment of the present technique.

FIG. 8 is a diagram for illustrating the definition of an amount of overlap between a laser driver 200 and a semiconductor laser 300 according to the embodiment of the present technique.

FIG. 9 is a diagram for illustrating a numerical example of a wiring inductance with respect to a wiring length L and a wiring width W in the case where a wiring pattern is formed by an additive method.

FIG. 10 is a diagram for illustrating a numerical example of the wiring inductance with respect to the wiring length L and the wiring width W in the case where a wiring pattern is formed by a subtractive method.

FIG. 11 depicts first diagrams each illustrating an example of a process of processing a copper land and copper redistribution layer (RDL) in a manufacturing process of the laser driver 200 according to the embodiment of the present technique.

FIG. 12 depicts second diagrams each illustrating an example of a process of processing the copper land and copper redistribution layer (RDL) in the manufacturing process of the laser driver 200 according to the embodiment of the present technique.

FIG. 14 depicts second diagrams each illustrating an example of the manufacturing process of the substrate 100 according to the embodiment of the present technique.

FIG. 16 depicts fourth diagrams each illustrating an example of the manufacturing process of the substrate 100 according to the embodiment of the present technique.

FIG. 17 depicts fifth diagrams each illustrating an example of the manufacturing process of the substrate 100 according to the embodiment of the present technique.

FIG. 23 depicts diagrams for illustrating an example of an illumination profile obtained by the light emitting unit 11 according to the second embodiment of the present technique.

DESCRIPTION OF EMBODIMENTS

Hereinafter, modes for carrying out the present technique (hereinafter, referred to as embodiments) will be described. The explanation will be given in the following order.
1. First embodiment (example of storing control data in setting memory)
2. Second embodiment (example of providing a plurality of semiconductor lasers)
3. Application example 1. First Embodiment

[Configuration of Distance Measurement Module]

Figure 1:
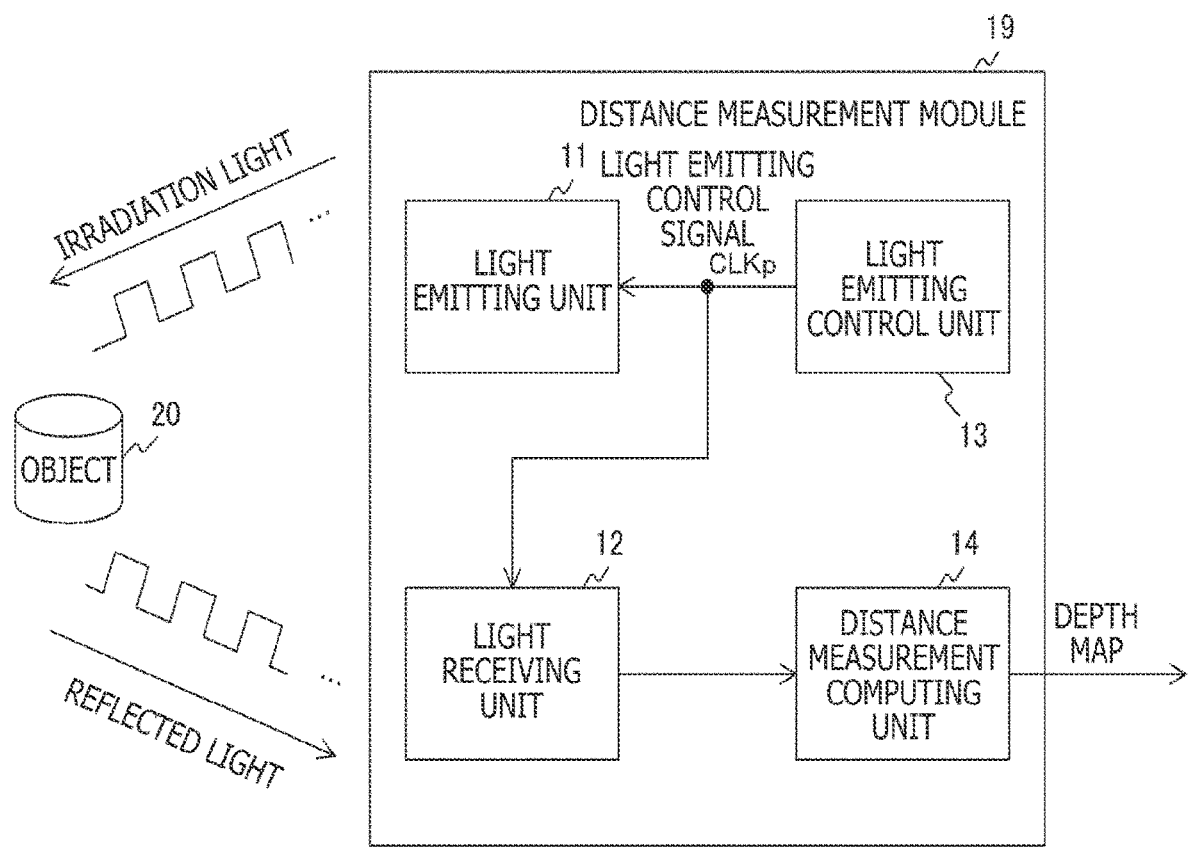
FIG. 1 is a diagram for illustrating a configuration example of a distance measurement module 19 according to an embodiment of the present technique.

FIG. 1 is a diagram for illustrating a configuration example of a distance measurement module 19 according to an embodiment of the present technique.

The distance measurement module 19 measures a distance by a ToF method, and includes a light emitting unit 11, a light receiving unit 12, a light emitting control unit 13, and a distance measurement computing unit 14. It should be noted that the distance measurement module 19 is an example of the semiconductor laser driving apparatus described in the claims.

The light emitting unit 11 emits irradiation light whose brightness periodically fluctuates and irradiates an object 20 with the irradiation light. The light emitting unit 11 generates the irradiation light in synchronization with, for example, a light emitting control signal CLKp of a rectangular wave. In addition, for example, a laser or a light emitting diode is used as the light emitting unit 11, and infrared light, near-infrared light, or the like having a wavelength in the range of 780 to 1000 nm is used as the irradiation light. It should be noted that the light emitting control signal CLKp is not limited to the rectangular wave as long as it is a periodic signal. For example, the light emitting control signal CLKp may be a sine wave.

The light emitting control unit 13 controls the irradiation timing of the irradiation light. The light emitting control unit 13 generates the light emitting control signal CLKp and supplies the same to the light emitting unit 11 and the light receiving unit 12. In addition, the light emitting control signal CLKp may be generated by the light receiving unit 12, and in this case, the light emitting control signal CLKp generated by the light receiving unit 12 is amplified by the light emitting control unit 13 and supplied to the light emitting unit 11. The frequency of the light emitting control signal CLKp is, for example, 100 megahertz (MHz). It should be noted that the frequency of the light emitting control signal CLKp is not limited to 100 MHz, and may be 200 MHz or the like. In addition, the light emitting control signal CLKp may be a single-ended signal or a differential signal.

The light receiving unit 12 receives reflected light reflected from the object 20, and detects, every time the period of a vertical synchronization signal elapses, the amount of light received within the period. For example, a periodic signal of 60 Hz is used as the vertical synchronization signal. In addition, a plurality of pixel circuits is arranged in a two-dimensional lattice shape in the light receiving unit 12. The light receiving unit 12 supplies image data (frame) including pixel data corresponding to the amount of light received by these pixel circuits to the distance measurement computing unit 14. It should be noted that the frequency of the vertical synchronization signal is not limited to 60 Hz, and may be, for example, 30 or 120 Hz.

The distance measurement computing unit 14 measures a distance to the object 20 on the basis of the image data by using the ToF method. The distance measurement computing unit 14 measures the distance for each pixel circuit and generates, for each pixel, a depth map indicating the distance to the object 20 by a gradation value. The depth map is used in, for example, image processing for performing blurring processing of a degree corresponding to the distance, AF (Auto Focus) processing for obtaining the focus of a focus lens on the basis of the distance, and the like. In addition, the depth map is expected to be used for gesture recognition, object recognition, obstacle detection, augmented reality (AR), virtual reality (VR), and the like.

It should be noted that, although an example of the distance measurement module for measuring a distance has been described here, the present technique can be applied to a sensing module in general.

Figure 2:
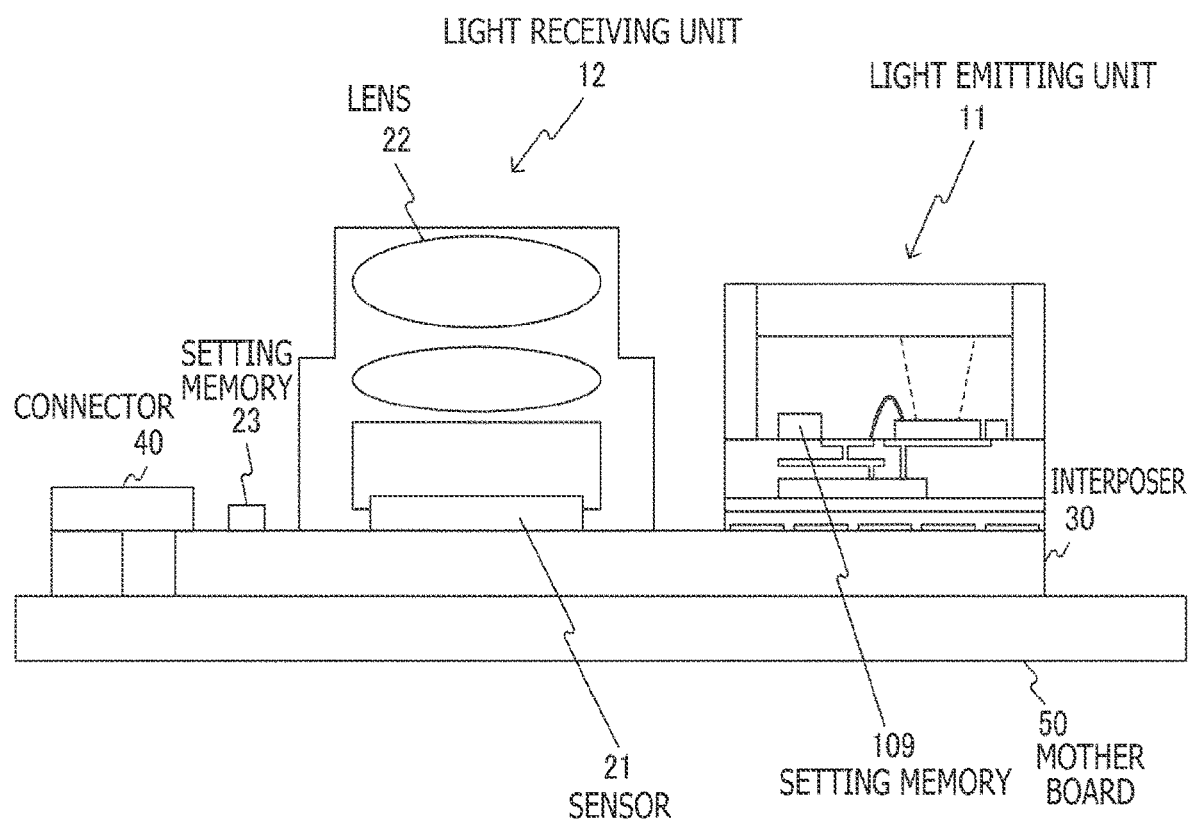
FIG. 2 is a diagram for illustrating an example of a cross-sectional view of the distance measurement module 19 according to the embodiment of the present technique.

FIG. 2 is a diagram for illustrating an example of a cross-sectional view of the distance measurement module 19 according to the embodiment of the present technique.

In this example, an interposer 30 as a relay part for a mother board 50 is provided on the mother board 50, and the light emitting unit 11 and the light receiving unit 12 are mounted on the interposer 30. A connector 40 is mounted on the interposer 30 and connected to an external application processor and the like.

The light receiving unit 12 includes a lens 22 and a sensor 21 for receiving reflected light reflected from the object 20.

A setting memory 23 is a memory for storing calibration data of the distance measurement module 19. The calibration data is, for example, calibration data or the like corresponding to temperature characteristics of the sensor 21 of the light receiving unit 12.

The setting memory 109 is a memory for storing control data of a semiconductor laser of the light emitting unit 11. The control data stored in the setting memory 109 will be described later.

Figure 3:
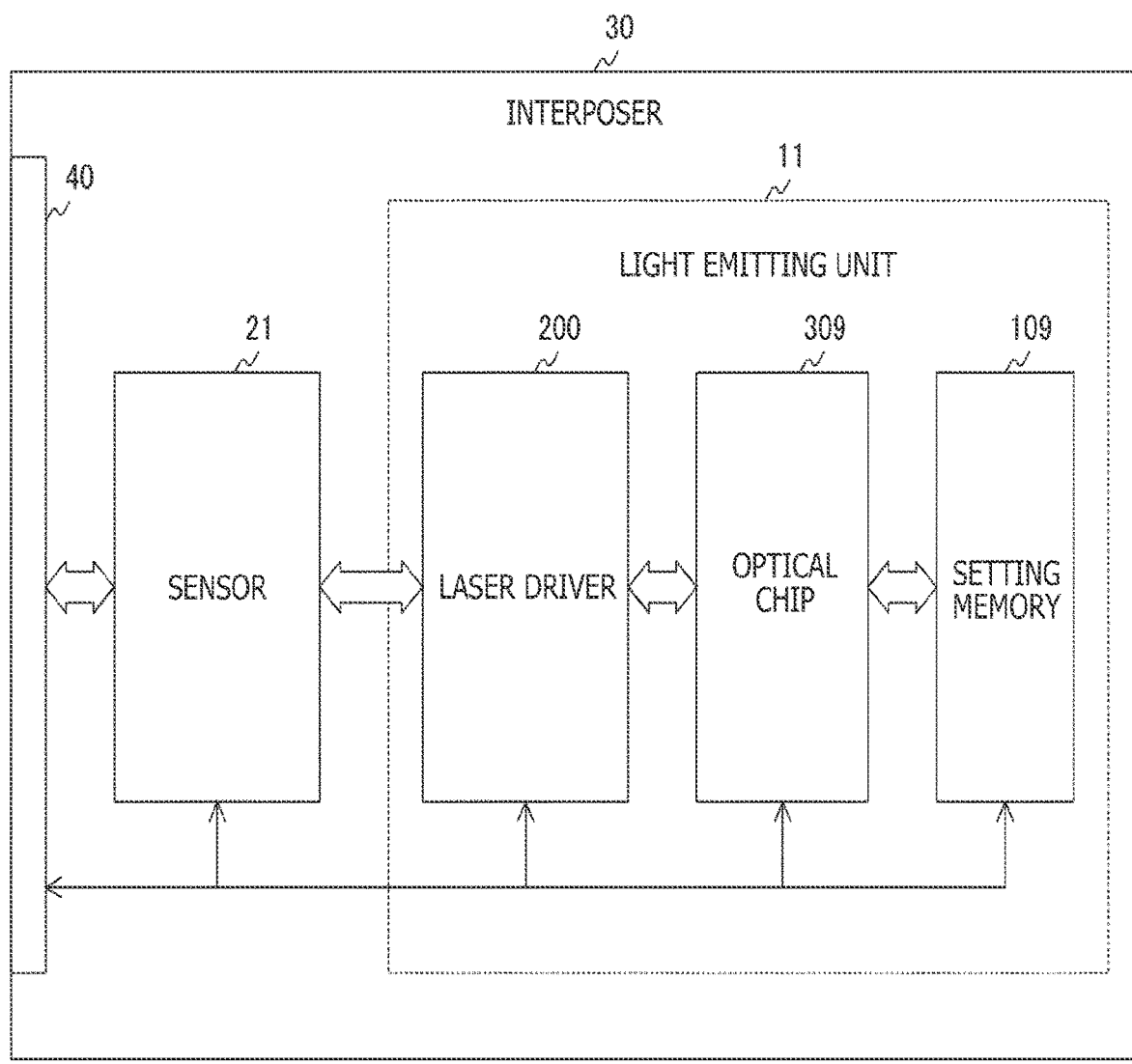
FIG. 3 is a diagram for illustrating an example of a wiring layout of the distance measurement module 19 according to the embodiment of the present technique.

FIG. 3 is a diagram for illustrating an example of a wiring layout of the distance measurement module 19 according to the embodiment of the present technique.

On the interposer 30, a laser driver 200, an optical chip 309, and a setting memory 109 are mounted as the light emitting unit 11. The optical chip 309 includes a semiconductor laser 300 and a photodiode to be described later.

In addition, the sensor 21 of the light receiving unit 12 is mounted on the interposer 30. The connector 40 is mounted on the interposer 30 and connected to an external application processor and the like.

[Configuration of Light Emitting Unit]

Figure 4:
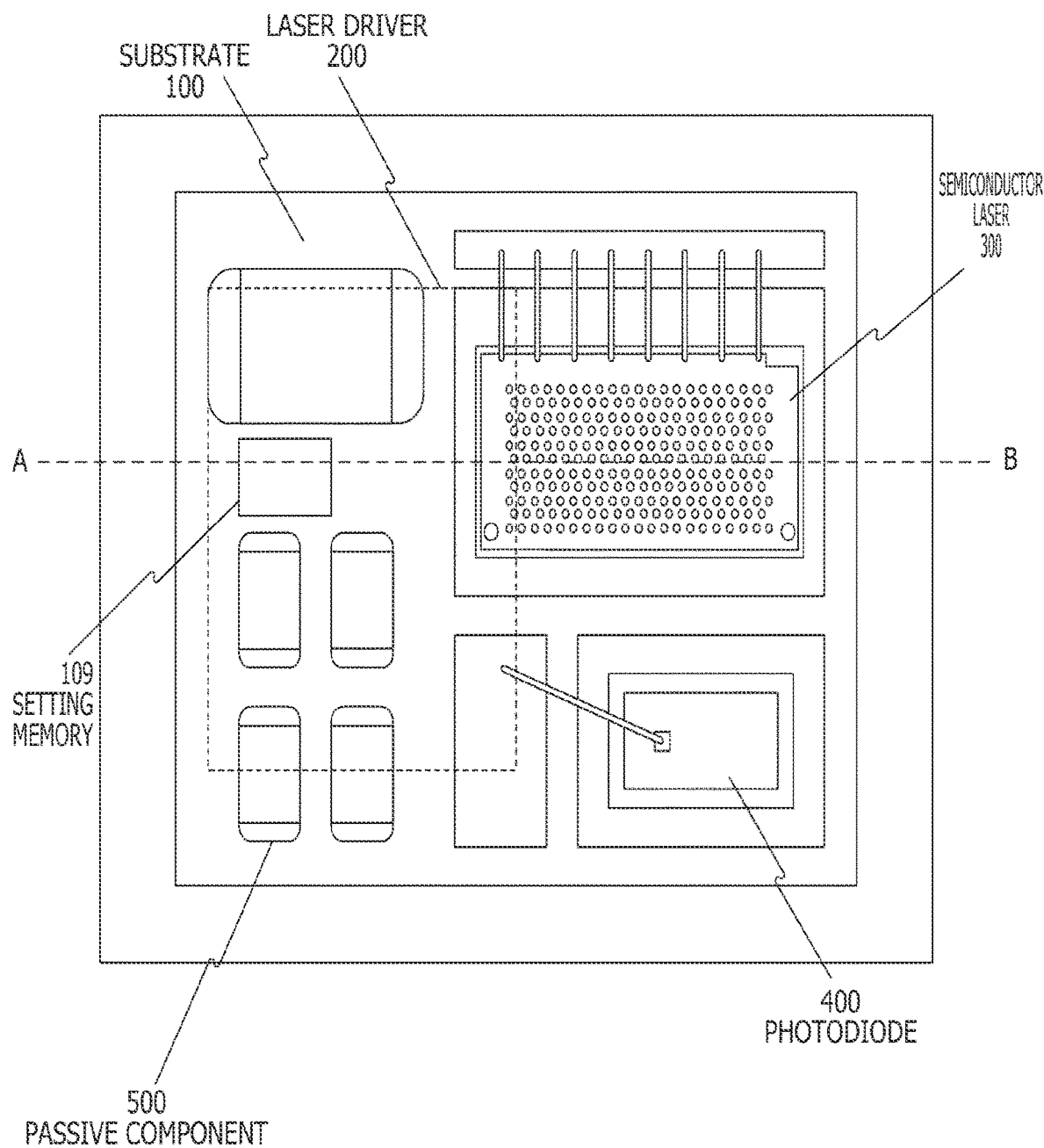
FIG. 4 is a diagram for illustrating an example of a top view of a light emitting unit 11 according to the embodiment of the present technique.

FIG. 4 is a diagram for illustrating an example of a top view of the light emitting unit 11 according to the embodiment of the present technique.

The light emitting unit 11 assumes measurement of a distance by ToF. ToF is high in depth accuracy although not as high as the structured light, and has such a characteristic that it can operate in a dark environment without any problem. In addition, ToF is considered to have many advantages as compared with other systems such as the structured light and the stereo camera in terms of the simplicity of the apparatus configuration and cost.

In the light emitting unit 11, a semiconductor laser 300, a photodiode 400, and a passive component 500 are electrically connected by wire bonding and mounted on the surface of a substrate 100 incorporating a laser driver 200. As the substrate 100, a printed wiring board is assumed.

The semiconductor laser 300 is a semiconductor device that emits laser light by allowing a current to flow through a PN junction of a compound semiconductor. Specifically, a vertical cavity surface emitting laser (VCSEL) is assumed. However, the semiconductor laser may be either a rear-surface light-emission type or a front-surface light-emission type. Here, as the compound semiconductor to be used, for example, aluminum gallium arsenide (AlGaAs), indium gallium arsenide phosphorus (InGaAsP), aluminum gallium indium phosphorus (AlGaInP), gallium nitride (GaN), and the like are assumed.

The laser driver 200 is a driver integrated circuit (IC) for driving the semiconductor laser 300. The laser driver 200 is incorporated in the substrate 100 in a face-up state. Regarding the electrical connection between the laser driver 200 and the semiconductor laser 300, since the wiring inductance needs to be reduced, it is desirable to make the wiring length as short as possible. This specific value will be described later.

The photodiode 400 is a diode for detecting light. The photodiode 400 is used for APC (Automatic Power Control) for maintaining the output of the semiconductor laser 300 constant by monitoring the light intensity of the semiconductor laser 300. This makes it possible to secure operation in a range that satisfies the safety standard of the laser.

The passive component 500 is a circuit component other than active elements such as a capacitor and a resistor. The passive component 500 includes a decoupling capacitor for driving the semiconductor laser 300.

Figure 5:
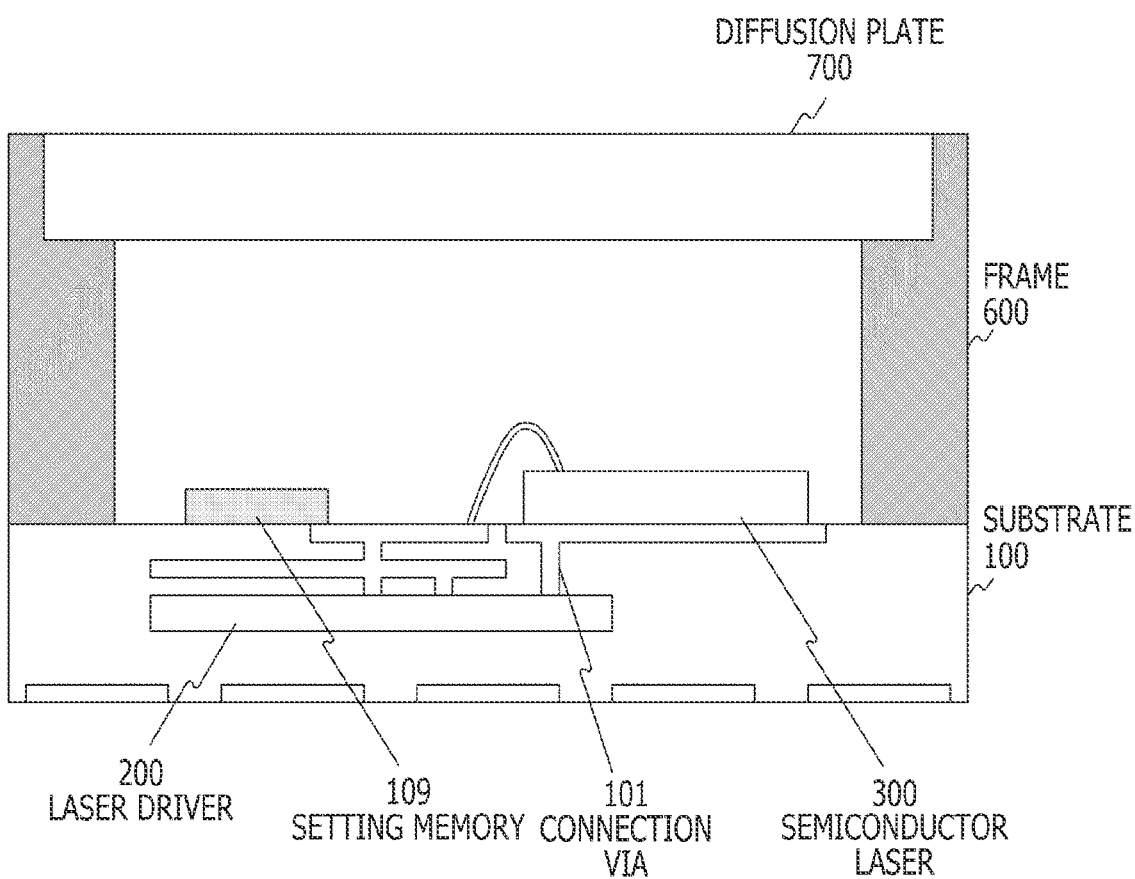
FIG. 5 is a diagram for illustrating an example of a cross-sectional view of the light emitting unit 11 according to a first embodiment of the present technique.

FIG. 5 is a diagram for illustrating an example of a cross-sectional view of the light emitting unit 11 according to the first embodiment of the present technique.

As described above, the substrate 100 incorporates the laser driver 200, and the semiconductor laser 300 and the like are mounted on the surface thereof. The connection between the semiconductor laser 300 and the laser driver 200 on the substrate 100 is made via a connection via 101. The wiring length can be shortened by use of the connection via 101. It should be noted that the connection via 101 is an example of the connection wiring described in the claims.

In addition, the semiconductor laser 300, the photodiode 400, and the passive component 500 mounted on the surface of the substrate 100 are surrounded by a frame 600. As a material of the frame 600, for example, a plastic material or metal is assumed.

The upper surface surrounded by the frame 600 is covered with a diffusion plate 700. The diffusion plate 700 is an optical element for diffusing the laser light from the semiconductor laser 300, and is also called a diffuser.

In addition, the setting memory 109 is mounted on the surface of the substrate 100. The setting memory 109 is a memory for storing the control data of the semiconductor laser of the light emitting unit 11 as described above.

Figure 6:
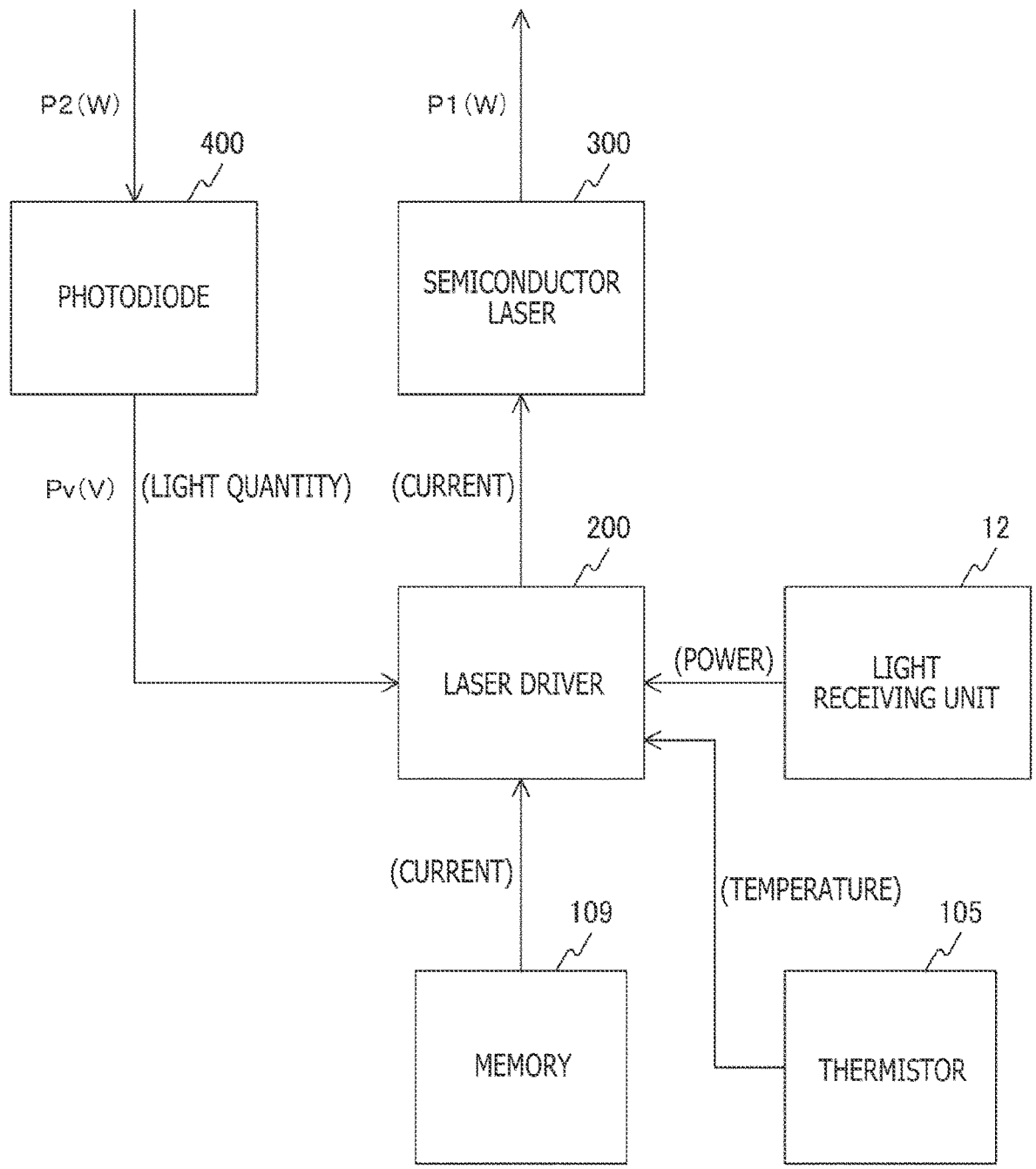
FIG. 6 is a diagram for illustrating an example of a functional configuration of the light emitting unit 11 according to the first embodiment of the present technique.

FIG. 6 is a diagram for illustrating an example of a functional configuration of the light emitting unit 11 according to the first embodiment of the present technique.

The laser driver 200 drives the semiconductor laser 300 such that the semiconductor laser 300 outputs the laser power designated by the light receiving unit 12. At this time, since the semiconductor laser 300 is affected by temperature fluctuations, a thermistor 105 is provided as a temperature sensor for measuring a temperature relating to the semiconductor laser 300, and the laser driver 200 supplies a drive current to the semiconductor laser 300 on the basis of the measured temperature. Therefore, the setting memory 109 stores, as the control data, a drive current for the semiconductor laser 300 to output predetermined laser power, in a manner corresponding to the temperature relating to the semiconductor laser 300. Accordingly, the laser driver 200 can read the drive current corresponding to the temperature from the setting memory 109, on the basis of the temperature measured by the thermistor 105.

That is, laser power P1 (W) output from the semiconductor laser 300 is expressed as a function of a temperature T relating to the semiconductor laser 300 and a drive current I from the laser driver 200 as represented below.

$$P1 = f(T, I)$$

It should be noted that the thermistor 105 may be arranged at any place in the light emitting unit 11. For example, the thermistor 105 may be incorporated in the laser driver 200 or arranged near the semiconductor laser 300. The thermistor 105 is an example of the temperature sensor described in the claims.

A laser output from the semiconductor laser 300 is partially reflected by the diffusion plate 700 according to the reflectance of the diffusion plate 700, and enters the photodiode 400. Laser power P2 (W) of the reflected light entering the photodiode 400 is proportional to the laser power P1 when the surrounding environment is the same. That is, the reflection ratio "P2/P1" represents a constant value when the surrounding environment is the same. In other words, in the case where the reflection ratio "P2/P1" changes, it indicates that the surrounding environment has changed due to some kind of factor. For example, in the case where the diffusion plate 700 is damaged, the proportion of reflected light entering the photodiode 400 is significantly lowered.

Here, the laser power P2 of the reflected light is photo-electrically converted by the photodiode 400, and an output voltage Pv (V) of the photodiode 400 is supplied to the laser driver 200. At this time, the sensitivity "P2/Pv" of the photodiode 400 is affected by temperature fluctuations. As described above, since the reflection ratio "P2/P1" basically represents a constant value, the laser driver 200 can detect a change in the surrounding environment if the reference value of "P1/Pv" is identified. In the photodiode 400 in a state in which the current I is allowed to flow from the laser driver 200 to the semiconductor laser at the time of shipment from a factory, that is, in a state of no failure and no deterioration with time, the output voltage Pv and the voltage corresponding to the temperature T measured by the thermistor 105 are input to the laser driver 200. Then, the laser driver 200 obtains "P1/Pv" on the basis of the relation of P1=f(T, I), and stores, as the control data, the reference value of "P1/Pv" in the setting memory 109. Accordingly, the laser driver 200 can read the reference value of "P1/Pv"

corresponding to the temperature from the setting memory 109, on the basis of the temperature measured by the thermistor 105.

In the case where the diffusion plate 700 is damaged, the ratio "P1/Pv" between the laser power P1 output from the semiconductor laser 300 and the light quantity Pv of the photodiode 400 becomes extremely lower than the reference value read from the setting memory 109. For example, in the case where "P1/Pv" is equal to or less than 50% of the reference value, the laser driver 200 stops the output from the semiconductor laser 300 in consideration of the possibility that the diffusion plate 700 has been damaged.

In addition, in the long term, in the case where the semiconductor laser 300 gradually deteriorates and fails to output the laser power P1 expected by the laser driver 200, the light quantity Pv of the photodiode 400 is reduced, and "P1/Pv" becomes higher than the reference value. For example, in the case where "P1/Pv" is 1.1 times the reference value, the laser driver 200 increases the required value of the laser power in the semiconductor laser 300 by 10% in a manner corresponding to the temperature relating to the semiconductor laser 300 and supplies the drive current. That is, the laser driver 200 increases the drive current.

FIG. 7 is a diagram for illustrating an example of the control data stored in the setting memory 109 according to the first embodiment of the present technique.

In this example, the setting memory 109 stores the drive current from the laser driver 200 to the semiconductor laser 300 corresponding to the laser power output from the semiconductor laser 300. In addition, the drive current is stored in a manner corresponding to the temperature relating to the semiconductor laser 300.

Thus, the laser driver 200 can recognize the drive current to be supplied to the semiconductor laser 300 by reading from the setting memory 109 the drive current corresponding to the laser power designated by the light receiving unit 12 and the temperature measured by the thermistor 105. For example, when laser power of 2 W is designated by the light receiving unit 12, if the temperature is 20° C., it can be understood that a drive current of 2.0 A is to be supplied to the semiconductor laser 300.

It should be noted that, although an example of storing the drive current as the control data has been described in this example, it is assumed that the reference value of "P1/Pv" described above is also similarly stored in a manner corresponding to the temperature. In addition, for "P1/Pv," the value of "P1/Pv" is stored in the setting memory 109 periodically (for example, an interval of one month) in order to monitor the output fluctuations of the laser caused by the deterioration of elements with time or the like. That is, the laser driver 200 receives date and time information output from an unillustrated application processor, via the light receiving unit 12. A new value of "P1/Pv" is stored in the setting memory 109 when there is an interval of one month or more as a result of a comparison with the last stored date and time of "P1/Pv" stored in the setting memory 109. In the case where a value of a series of recorded values of "P1/Pv" monotonically increases on average and "P1/Pv" is 1.1 times the reference value, the laser driver 200 increases the required value of the laser power in the semiconductor laser 300 by 10% in a manner corresponding to the temperature relating to the semiconductor laser 300 and supplies the drive current.

FIG. 8 depicts diagrams each illustrating the definition of an amount of overlap between the laser driver 200 and the semiconductor laser 300 according to the embodiment of the present technique.

As described above, since the connection between the semiconductor laser 300 and the laser driver 200 is assumed to be made via the connection via 101, the semiconductor laser 300 and the laser driver 200 are arranged while being overlapped one on another when viewed from the upper surface. On the other hand, it is desirable to provide a thermal via 102 on the lower surface of the semiconductor laser 300, and it is also necessary to secure a region therefor. Accordingly, in order to clarify the positional relation between the laser driver 200 and the semiconductor laser 300, the amount of overlap between the two is defined as follows.

In the arrangement illustrated in a of FIG. 8, there is no overlap region between the two when viewed from the upper surface. The overlap amount in this case is defined as 0%. On the other hand, in the arrangement illustrated in c of FIG. 8, the entire semiconductor laser 300 overlaps the laser driver 200 when viewed from the upper surface. The overlap amount in this case is defined as 100%.

Then, in the arrangement illustrated in b of FIG. 8, the half region of the semiconductor laser 300 overlaps the laser driver 200 when viewed from the upper surface. The overlap amount in this case is defined as 50%.

In the embodiment, the overlap amount is desirably larger than 0% to provide a region for the above-described connection via 101. On the other hand, when considering that a certain number of thermal vias 102 are to be arranged directly under the semiconductor laser 300, the overlap amount is desirably 50% or less. Thus, by making the overlap amount larger than 0% but 50% or less, the wiring inductance is reduced, and excellent heat radiation characteristics can be obtained.

[Wiring Inductance]

As described above, the wiring inductance becomes a problem in the connection between the semiconductor laser 300 and the laser driver 200. All conductors have an inductive component, and even an inductance of an extremely short lead wire may cause adverse effects in high frequency regions such as a ToF system. That is, when a high frequency operation is performed, the driving waveform for driving the semiconductor laser 300 from the laser driver 200 is distorted due to the influence of the wiring inductance, and the operation may become unstable.

Here, a theoretical equation for calculating the wiring inductance is examined. For example, the inductance IDC [μH] of a straight lead wire having a circular cross section with a length L [mm] and a radius R [mm] is represented in free space by the following equation. Note that ln represents the natural logarithm.

$$IDC=0.0002L \cdot (\ln(2L/R)-0.75)$$

In addition, for example, the inductance IDC [μH] of a strip line (substrate wiring pattern) having a length L [mm], a width W [mm], and a thickness H [mm] is represented in free space by the following equation.

$$IDC=0.0002L \cdot (\ln(2L/(W+H))+0.2235((W+H)/L)+0.5)$$

FIG. 9 and FIG. 10 illustrate the preliminary calculation of the wiring inductance [nH] between the laser driver incorporated inside the printed wiring board and the semiconductor laser electrically connected to an upper portion of the printed wiring board.

FIG. 9 is a diagram for illustrating a numerical example of a wiring inductance with respect to a wiring length L and a wiring width W in the case where a wiring pattern is formed by an additive method. The additive method is a method of forming a pattern by depositing copper only on a necessary part of an insulating resin surface.

FIG. 10 is a diagram for illustrating a numerical example of the wiring inductance with respect to the wiring length L and the wiring width W in the case where a wiring pattern is formed by a subtractive method. The subtractive is a method of forming a pattern by etching an unnecessary part of a copper-clad laminate.

In the case of a distance measurement module such as a ToF system, when assuming to drive at several hundred megahertz, the wiring inductance is desirably 0.5 nH or less, and more preferably 0.3 nH or less. Thus, when considering the above-described preliminary calculation result, it is considered that the wiring length between the semiconductor laser 300 and the laser driver 200 is desirably 0.5 millimeters or less, and more preferably 0.3 millimeters or less.

[Manufacturing Method]

FIG. 11 and FIG. 12 are diagrams each illustrating an example of a process of processing a copper land and copper redistribution layer (RDL) in a manufacturing process of the laser driver 200 of the embodiment of the present technique.

First, as illustrated in a of FIG. 11, an I/O pad 210 made of, for example, aluminum or the like is formed on a semiconductor wafer. Then, a protective insulating layer 220 such as SiN is deposited on the surface, and a region of the I/O pad 210 is opened.

Next, as illustrated in b of FIG. 11, a surface protective film 230 made of polyimide (PI) or polybenzoxazole (PBO) is deposited, and a region of the I/O pad 210 is opened.

Then, as illustrated in c of FIG. 11, titanium tungsten (TiW) of approximately several tens to hundreds nm and copper (Cu) of approximately 100 to 1000 nm are sequentially sputtered to form an adhesion layer and seed layer 240. Here, in addition to titanium tungsten (TiW), a refractory metal such as chromium (Cr), nickel (Ni), titanium (Ti), titanium copper (TiCu), or platinum (Pt), or an alloy thereof may be applied to the adhesion layer. Further, in addition to copper (Cu), nickel (Ni), silver (Ag), gold (Au), or an alloy thereof may be applied to the seed layer.

Subsequently, as illustrated in d of FIG. 12, a photoresist 250 is patterned in order to form a copper land and copper redistribution layer for electrical bonding. Specifically, the copper land and copper redistribution layer for electrical bonding is formed by each of processes of surface cleaning, resist coating, drying, exposure, and development.

Then, as illustrated in e of FIG. 12, a copper land and copper redistribution layer (RDL) 260 for electrical bonding is formed on the adhesion layer and seed layer 240 by a plating method. Here, as the plating method, for example, an electrolytic copper plating method, an electrolytic nickel plating method, or the like can be used. In addition, it is desirable that the diameter of the copper land be approximately 50 to 100 micrometers, the thickness of the copper redistribution layer be approximately 3 to 10 micrometers, and the minimum width of the copper redistribution layer be approximately 10 micrometers.

Next, as illustrated in f of FIG. 12, the photoresist 250 is removed, and the copper land and copper redistribution layer (RDL) 260 of the semiconductor chip is masked and dry-etched. Here, as the dry etching, for example, ion milling for applying an argon ion beam can be used. An unnecessary region of the adhesion layer and seed layer 240 can be selectively removed by the dry etching, and the copper land and copper redistribution layers are separated from each other. It should be noted that the unnecessary region can be removed by wet etching using an aqueous solution of aqua regia, cerium (TV) nitrate ammonium, or potassium hydroxide, but is desirably removed by dry etching in consideration of side etching and thickness reduction of metal layers configuring the copper land and copper redistribution layer.

FIG. 13 to FIG. 17 are diagrams each illustrating an example of a manufacturing process of the substrate 100 according to the embodiment of the present technique.

Figure 13:
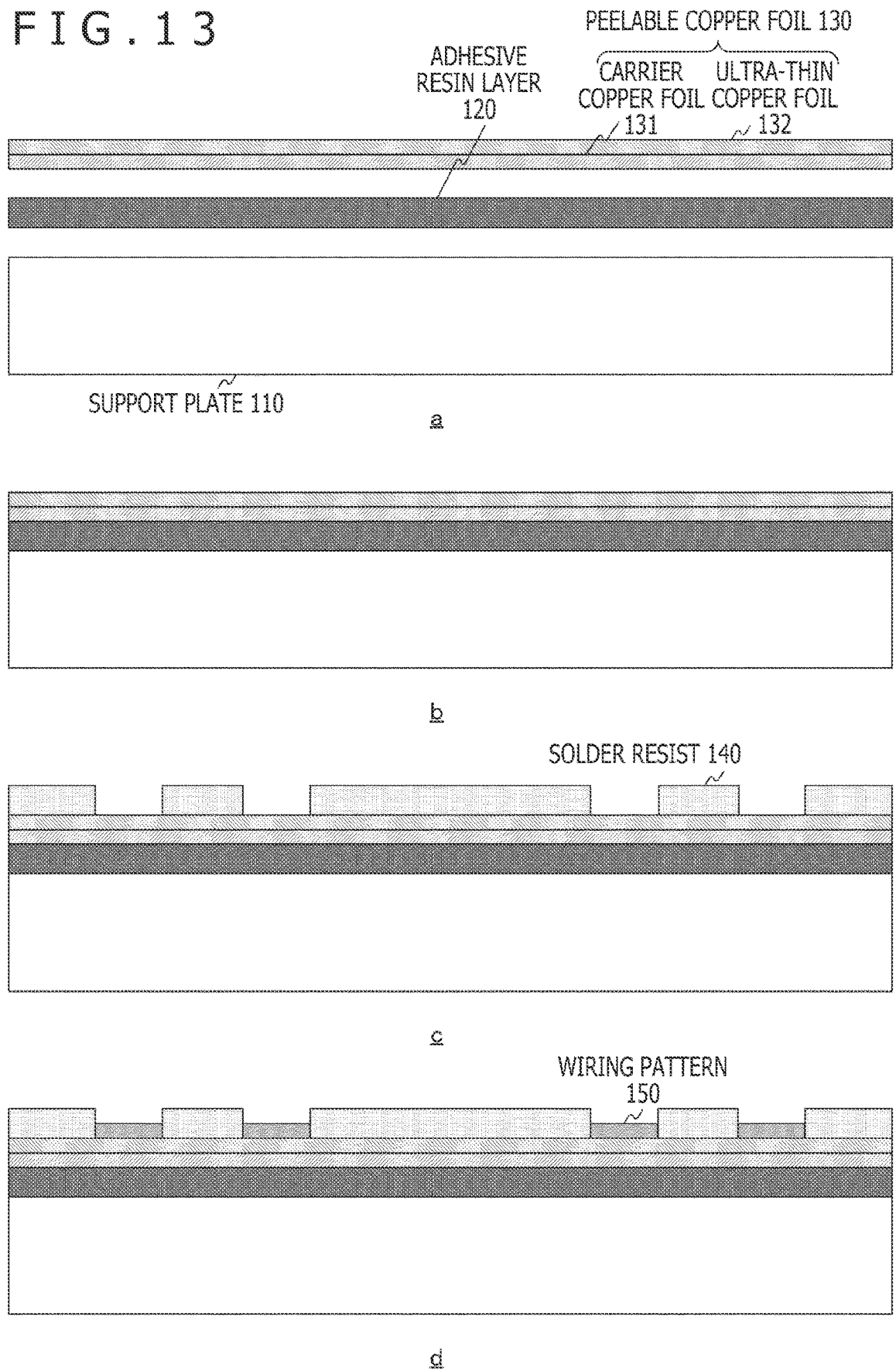
FIG. 13 depicts first diagrams each illustrating an example of a manufacturing process of a substrate 100 according to the embodiment of the present technique.

First, as illustrated in a of FIG. 13, a peelable copper foil 130 having a two-layer structure of an ultra-thin copper foil 132 and a carrier copper foil 131 is thermocompression bonded to one surface of a support plate 110 via an adhesive resin layer 120 by roll laminating or laminating press.

As the support plate 110, a substrate made of an inorganic material, a metal material, a resin material, or the like can be used. For example, silicon (Si), glass, ceramic, copper, a copper-based alloy, aluminum, an aluminum alloy, stainless steel, a polyimide resin, or an epoxy resin can be used.

The carrier copper foil 131 having a thickness of 18 to 35 micrometers is vacuum-adhered to the ultra-thin copper foil 132 having a thickness of 2 to 5 micrometers, to be used as the peelable copper foil 130. As the peelable copper foil 130, for example, 3FD-P3/35 (made by Furukawa Circuit Foil Co., Ltd.), MT-18S5DH (made by MITSUI MINING & SMELTING CO., LTD.), or the like can be used.

As a resin material of the adhesive resin layer 120, an organic resin containing a reinforcing material of a glass fiber, such as an epoxy resin, a polyimide resin, a PPE resin, a phenol resin, a PTFE resin, a silicon resin, a polybutadiene resin, a polyester resin, a melamine resin, a urea resin, a PPS resin, and a PPO resin can be used. In addition, as the reinforcing material, an aramid nonwoven fabric, an aramid fiber, a polyester fiber, or the like can be used in addition to the glass fiber.

Next, as illustrated in b of FIG. 13, a plating base conductive layer (not illustrated) having a thickness of 0.5 to 3 micrometers is formed on the surface of the ultra-thin copper foil 132 of the peelable copper foil 130 by an electroless copper plating treatment. It should be noted that, in the electroless copper plating treatment, a conductive layer is formed as a base of electrolytic copper plating for forming a wiring pattern next. However, by omitting the electroless copper plating treatment, an electrode for electrolytic copper plating may be brought into direct contact with the peelable copper foil 130, and an electrolytic copper plating treatment may be directly applied on the peelable copper foil 130 to form a wiring pattern.

Then, as illustrated in c of FIG. 13, a photosensitive resist is pasted on the surface of the support plate by roll laminating, to form a resist pattern (solder resist 140) for a wiring pattern. As the photosensitive resist, for example, a plating resist of a dry film can be used.

Subsequently, as illustrated in d of FIG. 13, a wiring pattern 150 having a thickness of approximately 15 micrometers is formed by an electrolytic copper plating treatment.

Then, as illustrated in e of FIG. 14, the plating resist is peeled off. Then, as a pretreatment for forming an interlayer insulating resin, the surface of the wiring pattern is roughened to improve the adhesion between the interlayer insulating resin and the wiring pattern. It should be noted that the roughening treatment can be performed by a blackening treatment by an oxidation/reduction treatment or a soft etching treatment using a sulfuric acid hydrogen peroxide mixture.

Next, as illustrated in f of FIG. 14, an interlayer insulating resin 161 is thermocompression bonded on the wiring pattern by roll laminating or laminating press. For example, an epoxy resin having a thickness of 45 micrometers is rolllaminated. In the case where a glass epoxy resin is used, copper foils having any thickness are superposed and thermocompression bonded by laminating press. As a resin material of the interlayer insulating resin 161, an organic resin such as an epoxy resin, a polyimide resin, a PPE resin, a phenol resin, a PTFE resin, a silicon resin, a polybutadiene resin, a polyester resin, a melamine resin, a urea resin, a PPS resin, and a PPO resin can be used. In addition, these resins alone or a combination of resins obtained by mixing a plurality of resins or preparing a compound can be used. Further, an interlayer insulating resin obtained by containing an inorganic filler in these materials or mixing a reinforcing material of a glass fiber can also be used.

Then, as illustrated in g of FIG. 14, a via hole for interlayer electrical connection is formed by a laser method or a photoetching method. In the case where the interlayer insulating resin 161 is a thermosetting resin, the via hole is formed by a laser method. As a laser beam, an ultraviolet laser such as a harmonic YAG laser or an excimer laser or an infrared laser such as a carbon dioxide gas laser can be used. It should be noted that, in the case where the via hole is formed by a laser beam, a desmear treatment is performed because a thin resin film may remain at the bottom of the via hole. In the desmear treatment, the resin is swollen by a strong alkali, and the resin is decomposed and removed by using an oxidizing agent such as chromic acid or a permanganate aqueous solution. In addition, the resin can also be removed by a plasma treatment or a sandblasting treatment by an abrasive material. In the case where the interlayer insulating resin 161 is a photosensitive resin, the via hole 170 is formed by a photoetching method. That is, the via hole 170 is formed by development after exposure using ultraviolet rays through a mask.

Next, after the roughening treatment, an electroless plating treatment is performed on the wall surface of the via hole 170 and the surface of the interlayer insulating resin 161. Then, a photosensitive resist is pasted by roll laminating on the surface of the interlayer insulating resin 161 subjected to the electroless plating treatment. As the photosensitive resist in this case, for example, a photosensitive plating resist film of a dry film can be used. The photosensitive plating resist film is exposed and then developed, so that a plating resist pattern with the portion of the via hole 170 and the portion of the wiring pattern being opened is formed. Subsequently, the opening portions of the plating resist pattern are subjected to a treatment of applying an electrolytic copper plating having a thickness of 15 micrometers. Then, the plating resist is peeled off, and the electroless plating remaining on the interlayer insulating resin is removed by flash etching using a sulfuric acid hydrogen peroxide mixture or the like, so that the via hole 170 filled with copper plating and the wiring pattern as illustrated in h of FIG. 14 are formed. Then, the similar steps of roughening the wiring pattern and forming the interlayer insulating resin 162 are repeated.

Subsequently, as illustrated in i of FIG. 15, the laser driver 200 with a die attach film (DAF) 290 obtained by processing the copper land and copper redistribution layer with a thickness reduced to approximately 30 to 50 micrometers is mounted in a face-up state.

Figure 15:
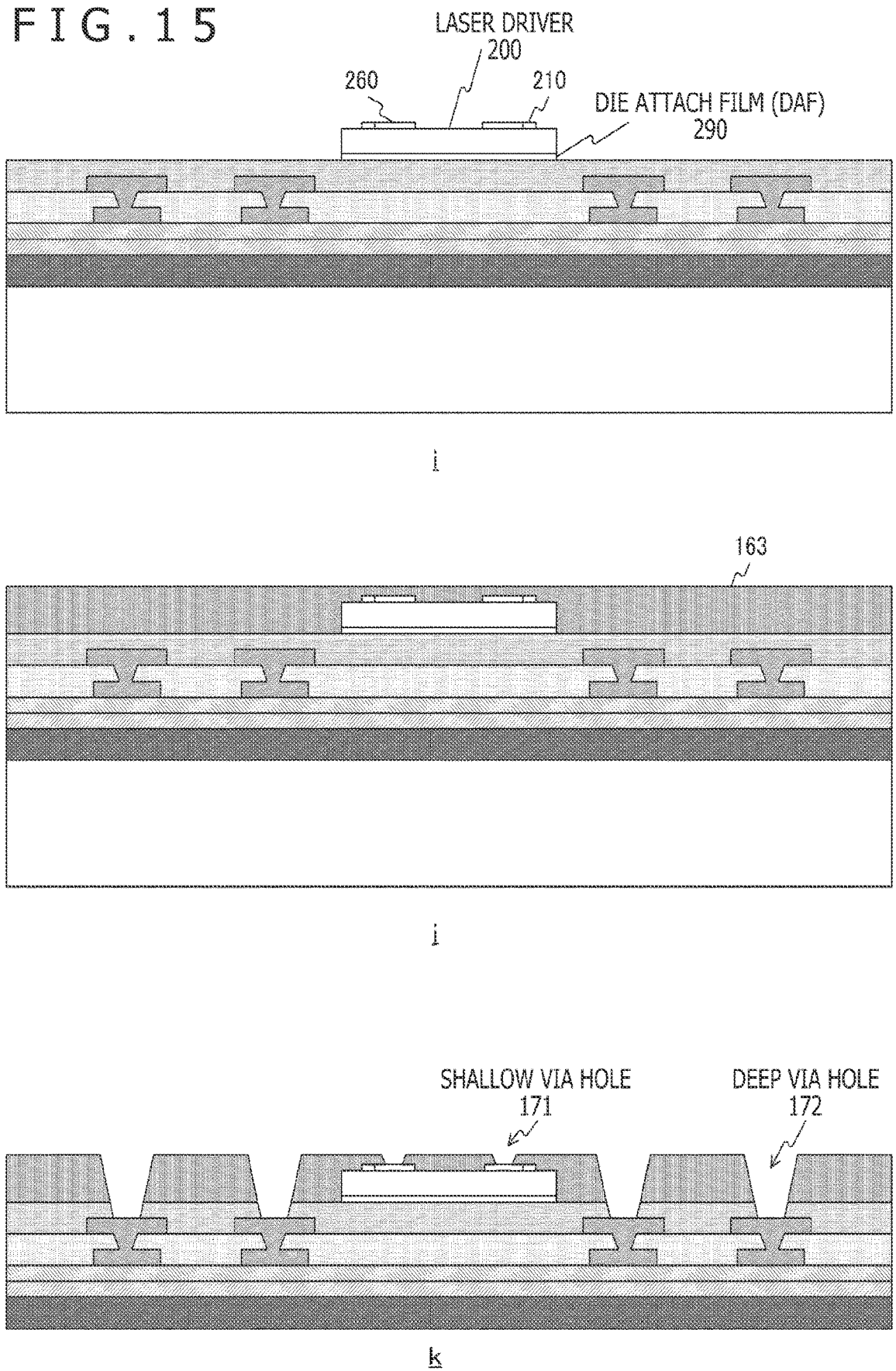
FIG. 15 depicts third diagrams each illustrating an example of the manufacturing process of the substrate 100 according to the embodiment of the present technique.

Then, as illustrated in j of FIG. 15, the interlayer insulating resin 163 is thermocompression bonded by roll laminating or laminating press.

Next, as illustrated in k of FIG. 15 and l of FIG. 16, the via hole processing, the desmear treatment, the roughening treatment, the electroless plating treatment, and the electrolytic plating treatment similar to the above are performed. It should be noted that processing of a shallow via hole 171 for the copper land of the laser driver 200 and processing of a deep via hole 172 located one layer below, the desmear treatment, and the roughening treatment are performed simultaneously.

Here, the shallow via hole 171 is a filled via filled with copper plating. Each of the size and depth of the via is approximately 20 to 30 micrometers. In addition, the size of the diameter of the land is approximately 60 to 80 micrometers.

On the other hand, the deep via hole 172 is what is generally called a conformal via in which copper plating is applied only to the outside of the via. Each of the size and depth of the via is approximately 80 to 150 micrometers. In addition, the size of the diameter of the land is approximately 150 to 200 micrometers. It should be noted that it is desirable that the deep via hole 172 be arranged via an insulating resin of approximately 100 micrometers from the outer shape of the laser driver 200.

Next, as illustrated in m of FIG. 16, the interlayer insulating resin similar to the above is thermocompression bonded by roll laminating or laminating press. At this time, the inside of the conformal via is filled with the interlayer insulating resin. Then, the via hole processing, the desmear treatment, the roughening treatment, the electroless plating treatment, and the electrolytic plating treatment similar to the above are performed.

Subsequently, as illustrated in n of FIG. 16, the support plate 110 is separated by being peeled off from the interface between the carrier copper foil 131 and the ultra-thin copper foil 132 of the peelable copper foil 130.

Then, as illustrated in o of FIG. 17, by removing the ultra-thin copper foil 132 and the plating base conductive layer with use of sulfuric acid-hydrogen peroxide-based soft etching, it is possible to obtain a component-incorporated substrate with the wiring pattern exposed.

Next, as illustrated in p of FIG. 17, a solder resist 180 of a pattern having an opening at the land portion of the wiring pattern is printed on the exposed wiring pattern. It should be noted that the solder resist 180 can be formed by a roll coater with use of a film type. Then, an electroless Ni plating of 3 micrometers or more is formed at the land portion of the opening of the solder resist 180, and an electroless Au plating of 0.03 micrometers or more is formed thereon. The electroless Au plating may be formed by one micrometer or more. Further, solder can be precoated thereon.

Alternatively, an electrolytic Ni plating of 3 micrometers or more may be formed at the opening of the solder resist 180, and an electrolytic Au plating of 0.5 micrometers or more may be formed thereon. Further, other than the metal plating, an organic rust preventive film may be formed at the opening of the solder resist 180.

In addition, a BGA (Ball Grid Array) of solder balls may be mounted on the land for external connection by printing and applying cream solder as a connection terminal. In addition, as the connection terminal, a copper core ball, a copper pillar bump, a land grid array (LGA), or the like may be used.

The semiconductor laser 300, the photodiode 400, the setting memory 109, and the passive component 500 are mounted on the surface of the substrate 100 thus manufactured as described above, and the frame 600 and the diffusion plate 700 are attached thereto. In general, after performing the processing in the form of an aggregate substrate, the outer shape is processed by a dicer or the like to be separated into individual pieces.

It should be noted that, although the example of using the peelable copper foil 130 and the support plate 110 has been described in the above process, a copper clad laminate (CCL) can be used instead. In addition, as the manufacturing method of incorporating the component into the substrate, a method of forming a cavity in the substrate and mounting the same may be used.

[Mounting of Setting Memory]

Although an example of mounting the setting memory 109 on the surface of the substrate 100 has been described in the above-described embodiment, the setting memory 109 may be arranged at other places.

Figure 18:
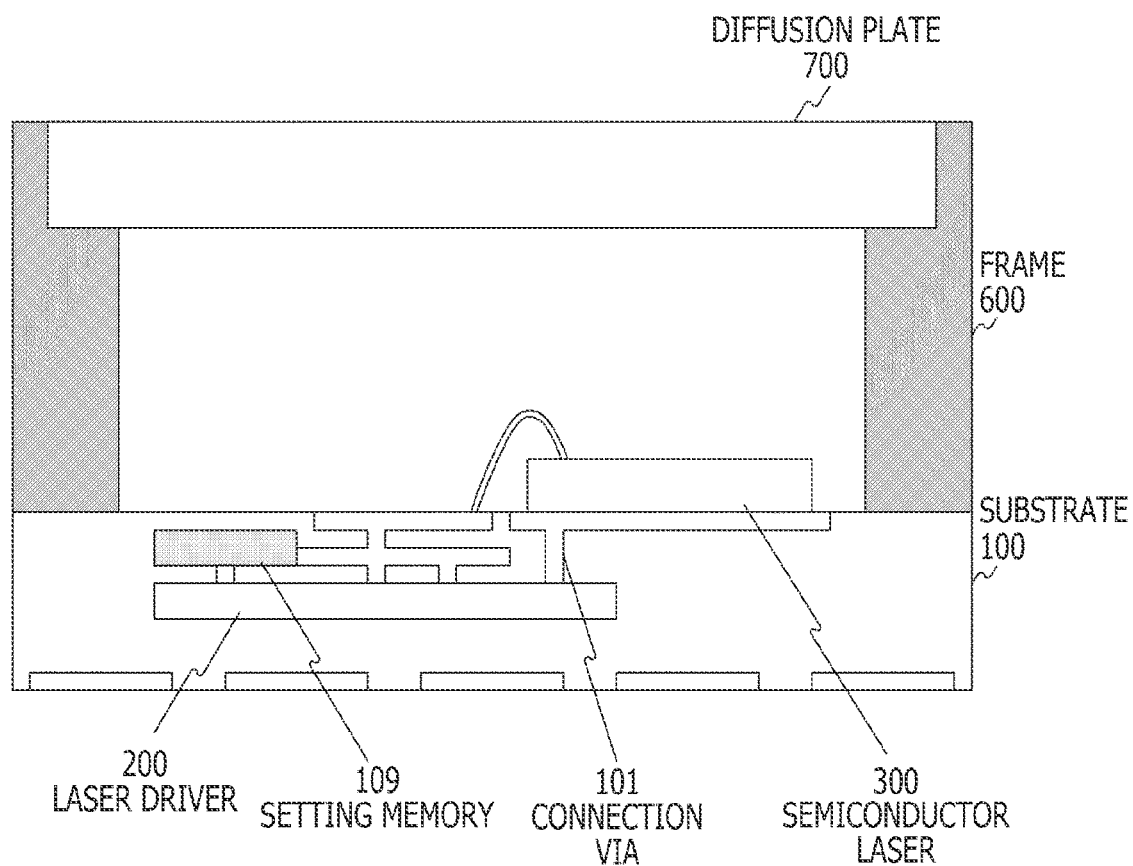
FIG. 18 is a diagram for illustrating another example of arrangement of the setting memory 109 according to the first embodiment of the present technique.

FIG. 18 is a diagram for illustrating another example of arrangement of the setting memory 109 according to the first embodiment of the present technique.

In this example, the setting memory 109 is incorporated in the substrate 100, as is the laser driver 200. At this time, the setting memory 109 and the laser driver 200 may be connected to each other by use of, for example, CuCu connection in which copper bumps are brought into contact with each other.

As in this example, incorporating the setting memory 109 in the substrate 100 makes it possible to improve the utilization efficiency of the surface of the substrate 100 and reduce the size of the substrate 100.

Figure 19:
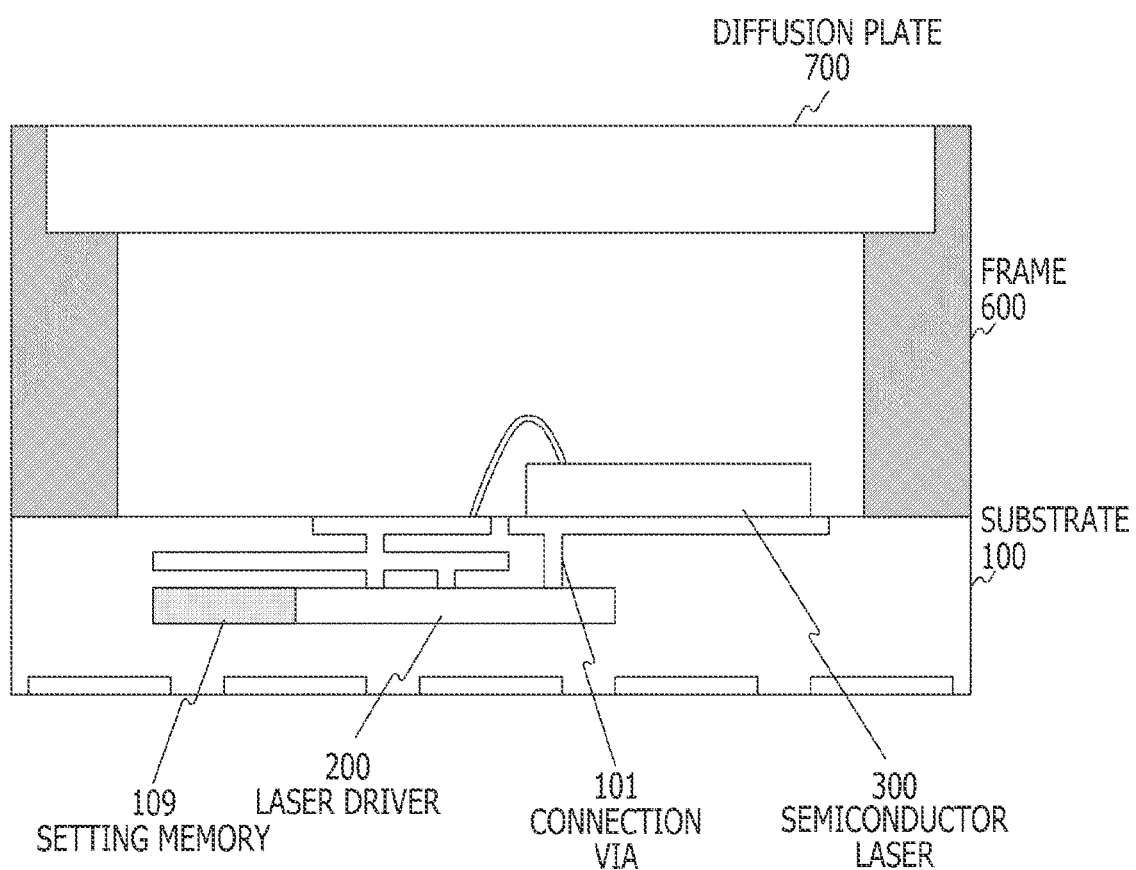
FIG. 19 is a diagram for illustrating still another example of the arrangement of the setting memory 109 according to the first embodiment of the present technique.

FIG. 19 is a diagram for illustrating still another example of the arrangement of the setting memory 109 according to the first embodiment of the present technique.

In this example, the setting memory 109 is mounted inside the laser driver 200. At this time, the laser driver 200 can access the setting memory 109 in the chip in a closed manner.

As in this example, mounting the setting memory 109 inside the laser driver 200 makes it possible to improve the utilization efficiency of the surface of the substrate 100 and further reduce the size of the substrate 100.

As described above, according to the first embodiment of the present technique, the control data for driving the semiconductor laser 300 can be stored while the wiring inductance between the semiconductor laser and the laser driver is reduced. Accordingly, APC control for keeping the output of the semiconductor laser 300 constant can be realized with high accuracy. That is, it is possible to monitor the laser power with high accuracy in consideration of the influence caused by variations in various components and temperature fluctuations, and to improve the stability of distance measurement accuracy by the distance measurement module.

Modified Example

While, in the above-described first embodiment, the setting memory 23 is assumed to be additionally provided as a memory for storing the calibration data of the distance measurement module 19, this calibration data may be stored in the setting memory 109.

Figure 20:
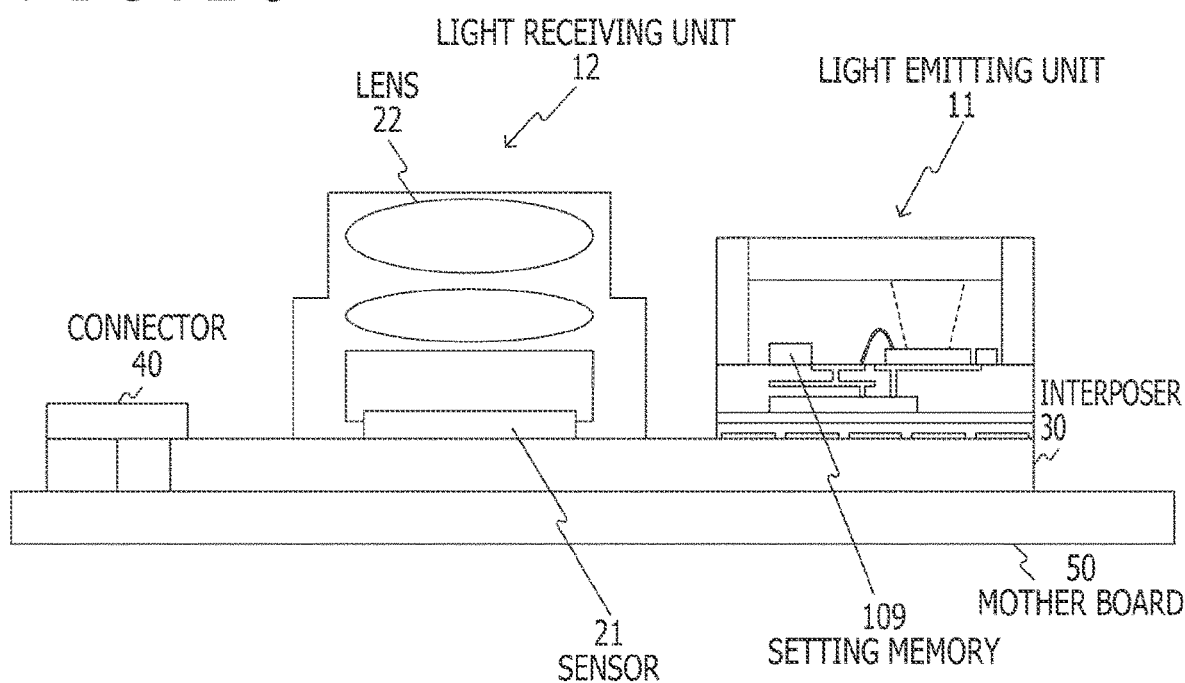
FIG. 20 is a diagram for illustrating an example of a cross-sectional view of a distance measurement module 19 according to a modified example of the embodiment of the present technique.

FIG. 20 is a diagram for illustrating an example of a cross-sectional view of a distance measurement module 19 according to a modified example of the embodiment of the present technique.

This modified example employs a structure in which the setting memory 23 is omitted by storing the calibration data in the setting memory 109. In this case, the light receiving unit 12 accesses the setting memory 109 to perform calibration in a manner corresponding to the temperature characteristics of the sensor 21. However, in the case where the setting memory 109 is mounted inside the laser driver 200 as in the above arrangement example of the setting memory 109, access from the light receiving unit 12 may become difficult.

2. Second Embodiment

Although one semiconductor laser 300 is assumed in the above-described first embodiment, an example in which a plurality of illumination profiles is provided with use of a plurality of semiconductor lasers will be described in a second embodiment.

Figure 21:
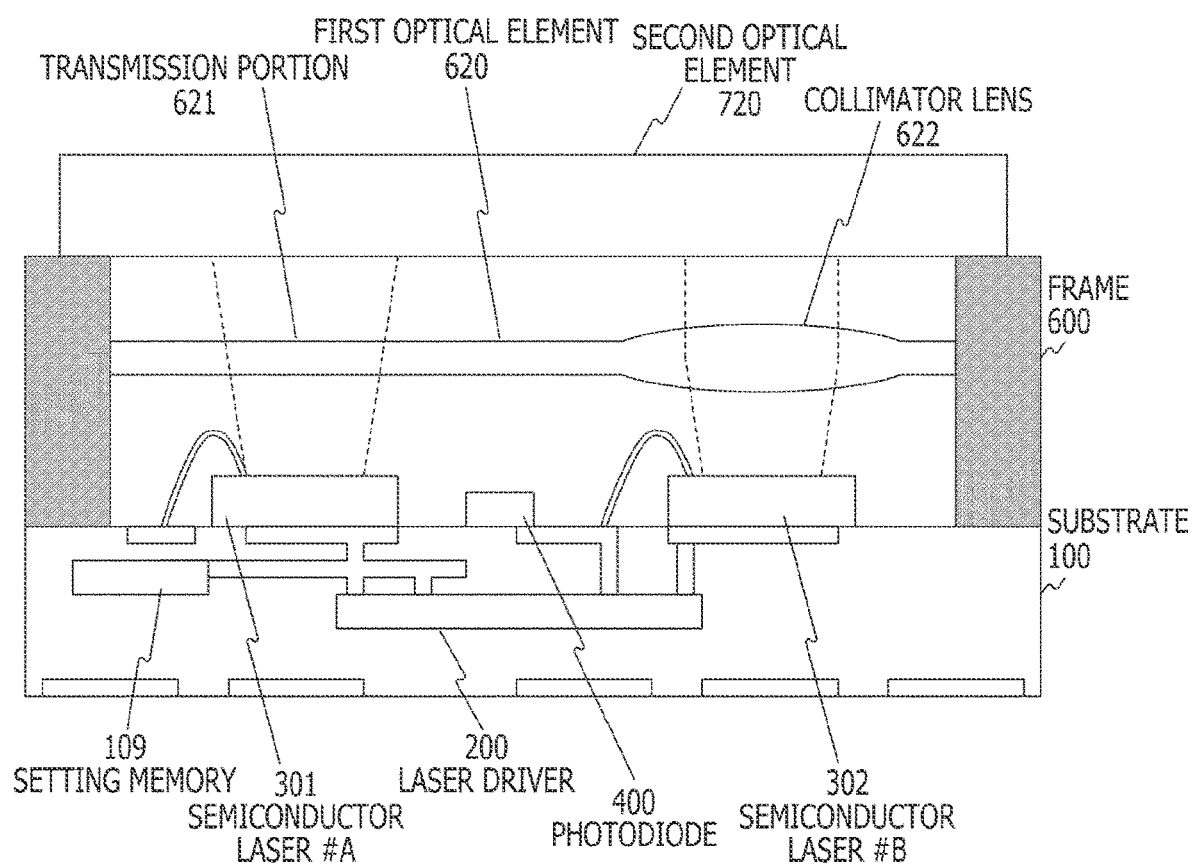
FIG. 21 is a diagram for illustrating an example of a cross-sectional view of a light emitting unit 11 according to a second embodiment of the present technique.

FIG. 21 is a diagram for illustrating an example of a cross-sectional view of a light emitting unit 11 according to the second embodiment of the present technique.

The light emitting unit 11 according to the second embodiment drives two semiconductor lasers #A (301) and #B (302) by a laser driver 200. In addition, a region #A for irradiation light from the semiconductor laser #A (301) is provided not with a collimator lens but with a transmission portion 621, and a region #B for irradiation light from the semiconductor laser #B (302) is provided with a collimator lens 622. Here, the transmission portion 621 and the collimator lens 622 can be formed integrally, and are collectively referred to as a first optical element 620. It should be noted that the first optical element 620 is an example of the first optical element described in the claims.

The first optical element 620 can be manufactured, for example, by forming a lens on a flat glass plate by using resin and curing the lens. In addition, the first optical element 620 can also be manufactured by press-forming resin like a mold.

In the first optical element 620, a column may be provided between the transmission portion 621 and the collimator lens 622. In addition, the transmission portion 621 may be hollow with no glass or the like being provided.

Accordingly, the irradiation light from the semiconductor laser #A (301) enters a second optical element 720 while spreading, and the irradiation light from the semiconductor laser #B (302) enters the second optical element 720 as parallel light.

This example illustrates an example in which the setting memory 109 is incorporated in the substrate 100, but other arrangements may be used. In the case where the plurality of semiconductor lasers is used as described above, since the semiconductor laser having higher laser power has a problem concerning the safety standard, it is desirable to store the control data for each semiconductor laser in the setting memory 109.

Figure 22:
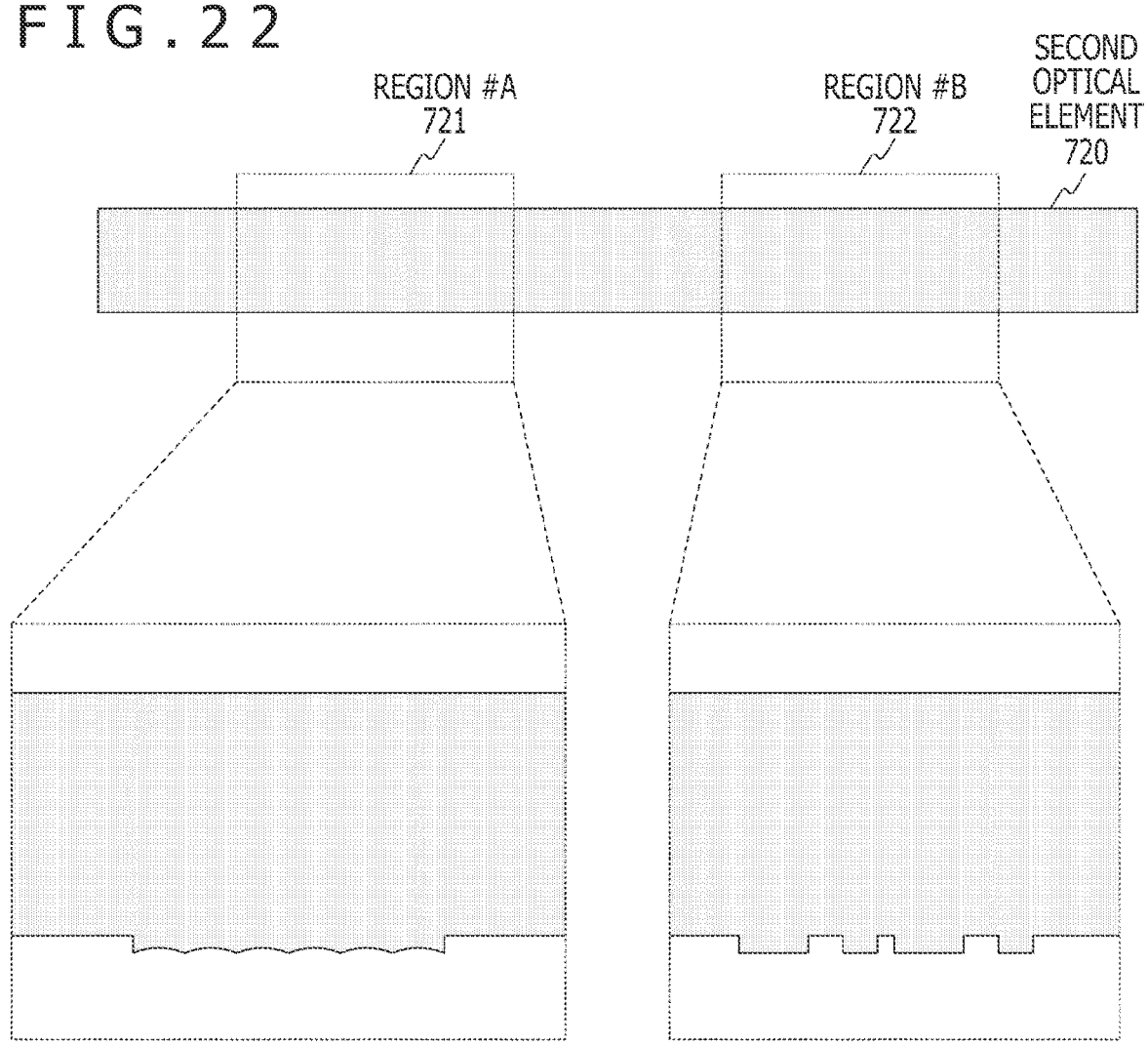
FIG. 22 is a diagram for illustrating an example of a cross-sectional view of a second optical element 720 according to the second embodiment of the present technique.

FIG. 22 is a diagram for illustrating an example of a cross-sectional view of the second optical element 720 according to the second embodiment of the present technique.

A concave microlens array having, for example, a pitch of several tens of micrometers and a depth of 10 to 30 micrometers is formed in the region #A (721) to which the irradiation light from the semiconductor laser #A (301) of the second optical element 720 is projected. Accordingly, the region #A (721) functions as a diffusion plate.

A binary diffraction element having, for example, a pitch of 10 micrometers and a depth of approximately 1 micrometer is formed in the region #B (722) to which the irradiation light from the semiconductor laser #B (302) of the second optical element 720 is projected. Accordingly, the region #B (722) functions as a diffraction element.

As described above, the second optical element 720 includes the region #A (721) and the region #B (722) that have different properties. It should be noted that the second optical element 720 is an example of the second optical element described in the claims.

FIG. 23 depicts diagrams for illustrating an example of an illumination profile obtained by the light emitting unit 11 according to the second embodiment of the present technique.

As illustrated in a of FIG. 23, the irradiation light from the semiconductor laser #A (301) is diffused in the region #A (721) of the second optical element 720 to become uniform beam irradiation. Although the intensity of the beam is average in this case, higher resolution can be obtained as compared with spot irradiation.

Meanwhile, as illustrated in b of FIG. 23, the irradiation light from the semiconductor laser #B (302) becomes parallel light by the collimator lens 622, is further diffracted in the region #B (722) of the second optical element 720, and becomes spot irradiation. In this case, the irradiation power per dot can be increased as compared with uniform beam irradiation.

That is, in the second embodiment, uniform beam irradiation and spot irradiation can be selectively used, according to applications such as resolution and the SN ratio.

As described above, according to the second embodiment of the present technique, providing different optical elements for a plurality of semiconductor lasers makes it possible to increase the number of illumination profiles and selectively use the illumination profile according to applications.

3. Application Example

[Electronic Equipment]

Figure 24:
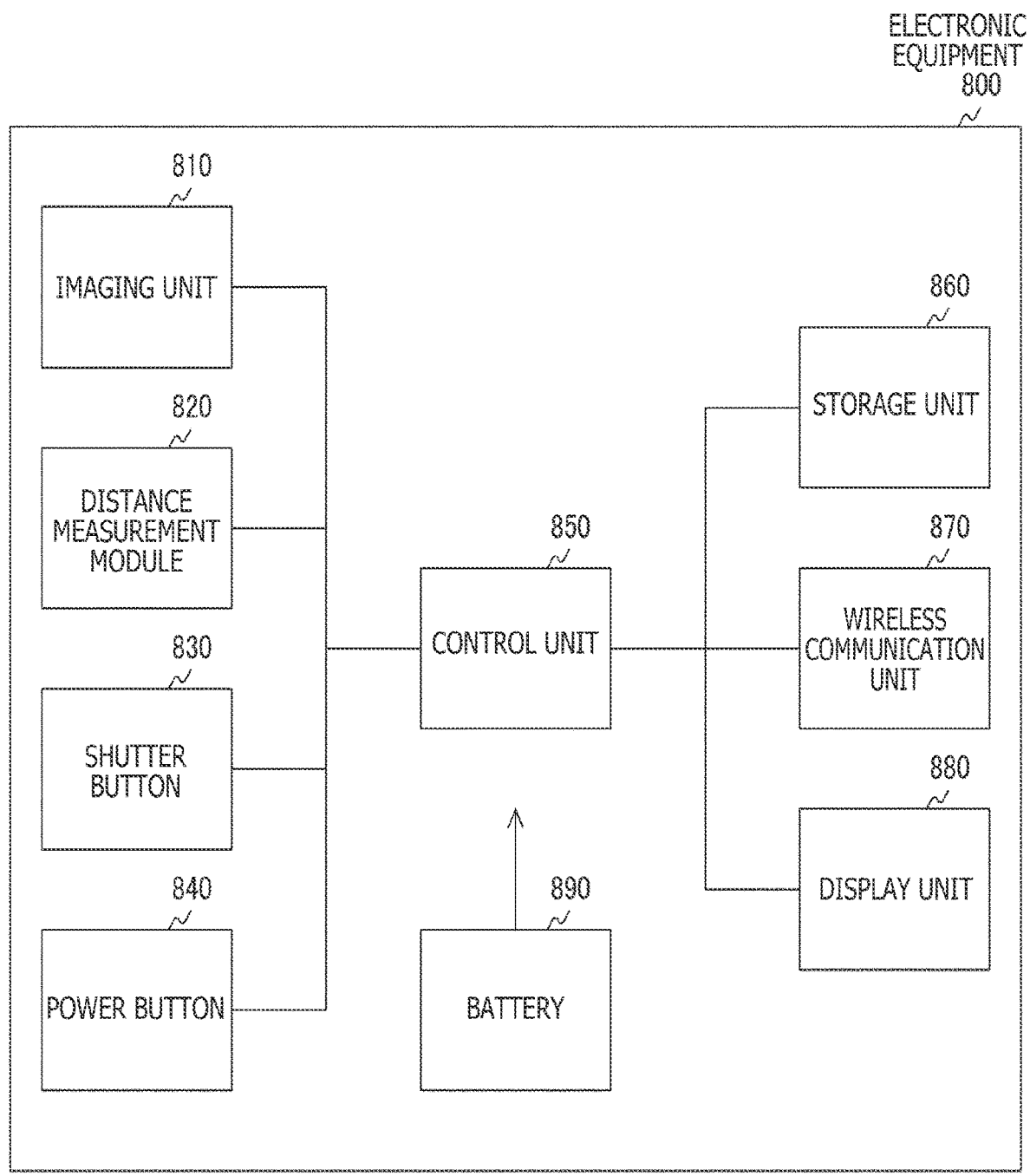
FIG. 24 is a diagram for illustrating a system configuration example of electronic equipment 800 as an application example of the embodiments of the present technique.

FIG. 24 is a diagram for illustrating a system configuration example of electronic equipment 800 as an application example of the embodiments of the present technique.

The electronic equipment 800 is a portable terminal in which the distance measurement module 19 according to the above-described embodiments is mounted. The electronic equipment 800 includes an imaging unit 810, a distance measurement module 820, a shutter button 830, a power button 840, a control unit 850, a storage unit 860, a radio communication unit 870, a display unit 880, and a battery 890.

The imaging unit 810 is an image sensor for imaging a subject. The distance measurement module 820 is the distance measurement module 19 according to the above-described embodiments.

The shutter button 830 is a button for giving an instruction on an imaging timing in the imaging unit 810 from the outside of the electronic equipment 800. The power button 840 is a button for giving an instruction on on/off of the power of the electronic equipment 800 from the outside of the electronic equipment 800.

The control unit 850 is a processing unit that controls the entire electronic equipment 800. The storage unit 860 is a memory for storing data and programs necessary for the operation of the electronic equipment 800. The wireless communication unit 870 performs wireless communication with the outside of the electronic equipment 800. The display unit 880 is a display for displaying an image or the like. The battery 890 is a power supply source for supplying power to each unit of the electronic equipment 800.

The imaging unit 810 detects the light receiving amount from 0 to 180 degrees as Q1 and detects the light receiving amount from 180 to 360 degrees as Q2 with a specific phase (for example, rising timing) of a light emission control signal for controlling the distance measurement module 820 defined as 0 degree. In addition, the imaging unit 810 detects the light receiving amount from 90 to 270 degrees as Q3 and detects the light receiving amount from 270 to 90 degrees as Q4. The control unit 850 computes a distance d to an object by the following equation on the basis of these light receiving amounts Q1 to Q4, and displays the distance d on the display unit 880.

$$d = (c/4\pi f) \times \arctan\{(Q3-Q4)/(Q1-Q2)\}$$

The unit of the distance d in the above equation is, for example, meters (m). In the equation, c is the speed of light, and the unit thereof is, for example, meters per second (m/s). In the equation, arctan is the inverse function of a tangent function. The value of "(Q3−Q4)/(Q1−Q2)" indicates a phase difference between the irradiated light and the reflected light. In the equation, n indicates the ratio of the circumference of a circle to its diameter. In addition, f is the frequency of the irradiated light, and the unit thereof is, for example, megahertz (MHz).

Figure 25:
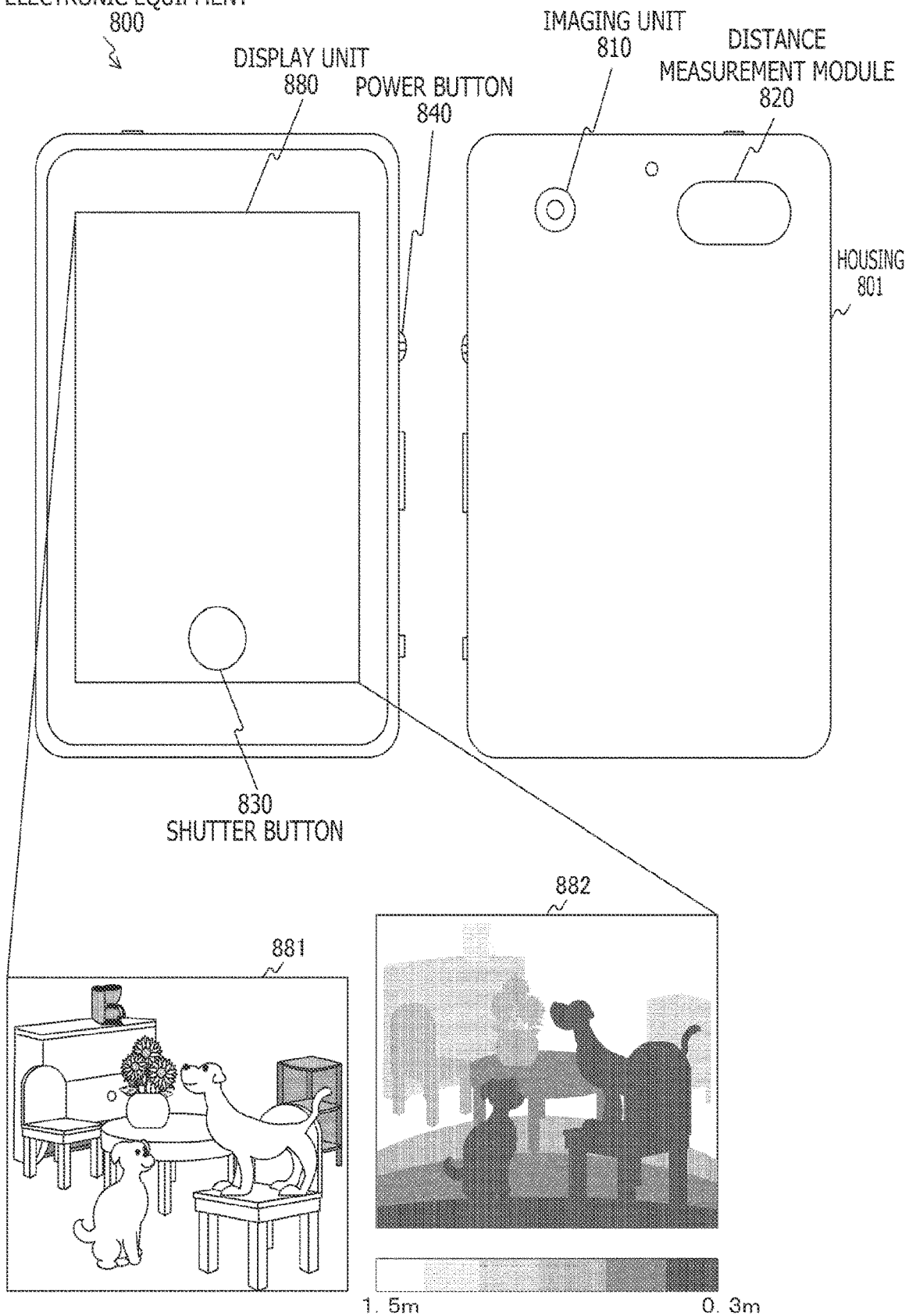
FIG. 25 is a diagram for illustrating an external configuration example of the electronic equipment 800 as an application example of the embodiments of the present technique.

FIG. 25 is a diagram for illustrating an external configuration example of the electronic equipment 800 as an application example of the embodiments of the present technique.

The electronic equipment 800 is housed in a housing 801, includes the power button 840 on a side surface, and includes the display unit 880 and the shutter button 830 on the front surface. In addition, optical regions of the imaging unit 810 and the distance measurement module 820 are provided on the rear surface.

Accordingly, the display unit 880 can display not only a normal captured image 881 but also a depth image 882 according to the distance measurement result using ToF.

It should be noted that, in the application example, a portable terminal such as a smartphone is exemplified as the electronic equipment 800, but the electronic equipment 800 is not limited thereto, and may be, for example, a digital camera, a game machine, wearable equipment, or the like.

It should be noted that the above-described embodiments illustrate an example for embodying the present technique, and the matters in the embodiments have corresponding relations with the matters specifying the invention in the claims. Similarly, the matters specifying the invention in the claims have corresponding relations with the matters in the embodiments of the present technique to which the same names are given. However, the present technique is not limited to the embodiments, and can be embodied by applying various modifications to the embodiments without departing from the gist thereof.

It should be noted that the effects described in the specification are merely illustrative and not limitative, and other effects may be provided.

It should be noted that the present technique can also be configured as follows.

(1) A semiconductor laser driving apparatus including:
a substrate incorporating a laser driver;
a semiconductor laser mounted on one surface of the substrate to emit irradiation light from an irradiation surface;
connection wiring that electrically connects the laser driver and the semiconductor laser to each other with a wiring inductance of 0.5 nanohenries or less;
a temperature sensor for measuring a temperature relating to the semiconductor laser; and
a memory for storing control data from the laser driver to the semiconductor laser in a manner corresponding to the temperature.

(2) The semiconductor laser driving apparatus according to (1),
in which the memory stores, as the control data, a drive current for the semiconductor laser to output predetermined laser power, and
the laser driver reads the corresponding drive current from the memory on the basis of the temperature measured by the temperature sensor and outputs the read drive current to the semiconductor laser.

(3) The semiconductor laser driving apparatus according to (1) or (2), further including:
an outer wall surrounding a region including the semiconductor laser on the one surface of the substrate;
a diffusion plate covering an upper part of the region surrounded by the outer wall; and
a photodiode that is mounted on the one surface of the substrate and monitors light intensity of laser light emitted from the semiconductor laser,
in which the memory stores an expected value of a ratio of the laser power to the light intensity, as the control data, and
the laser driver reads the corresponding expected value from the memory on the basis of the temperature measured by the temperature sensor and controls the semiconductor laser according to a relation between the ratio of the laser power to the light intensity and the read expected value.

(4) The semiconductor laser driving apparatus according to (3),
in which, in the case where the ratio of the laser power to the light intensity does not satisfy a predetermined range based on the read expected value, the laser driver controls the semiconductor laser such that the laser power increases.

(5) The semiconductor laser driving apparatus according to (3),
in which, in the case where the ratio of the laser power to the light intensity does not satisfy a predetermined range based on the read expected value, the laser driver performs control to stop the semiconductor laser.

(6) The semiconductor laser driving apparatus according to any one of (1) to (5),
in which the memory is mounted on one surface of the substrate.

(7) The semiconductor laser driving apparatus according to any one of (1) to (5),
in which the memory is incorporated in the substrate.

(8) The semiconductor laser driving apparatus according to any one of (1) to (5),
in which the memory is mounted inside the laser driver.

(9) The semiconductor laser driving apparatus according to any one of (1) to (8), further including:
a first optical element provided on the irradiation surface side of the semiconductor laser; and
a second optical element provided outside the first optical element on the irradiation surface side of the semiconductor laser,
in which the semiconductor laser includes first and second semiconductor lasers,
the first optical element is an optical element that allows irradiation light from the first semiconductor laser to pass therethrough and makes irradiation light from the second semiconductor laser into parallel light,
the second optical element is a diffusion element that refracts light having passed through the first optical element and a diffraction element that diffracts the parallel light from the first optical element, and the memory stores control data from the laser driver to the first and second semiconductor lasers in a manner corresponding to the temperature.

(10) The semiconductor laser driving apparatus according to any one of (1) to (9),
in which the connection wiring has a length of 0.5 millimeters or less.

(11) The semiconductor laser driving apparatus according to any one of (1) to (10),
in which the connection wiring is provided via a connection via provided in the substrate.

(12) The semiconductor laser driving apparatus according to any one of (1) to (11)
in which the semiconductor laser is arranged in such a manner that a part thereof overlaps an upper part of the laser driver.

(13) The semiconductor laser driving apparatus according to (12),
in which the semiconductor laser is arranged in such a manner that a part corresponding to 50% or less of an area thereof overlaps the upper part of the laser driver.

(14) Electronic equipment including:
a substrate incorporating a laser driver;
a semiconductor laser mounted on one surface of the substrate to emit irradiation light from an irradiation surface;
connection wiring that electrically connects the laser driver and the semiconductor laser to each other with a wiring inductance of 0.5 nanohenries or less;
a temperature sensor for measuring a temperature relating to the semiconductor laser; and
a memory for storing control data from the laser driver to the semiconductor laser in a manner corresponding to the temperature.

(15) A manufacturing method of a semiconductor laser driving apparatus, including:
a step of forming a laser driver on an upper surface of a support plate;
a step of forming a substrate incorporating the laser driver, by forming connection wiring of the laser driver;
a step of mounting a semiconductor laser on one surface of the substrate and forming connection wiring that electrically connects the laser driver and the semiconductor laser to each other via the connection wiring with a wiring inductance of 0.5 nanohenries or less;
a step of mounting a temperature sensor for measuring a temperature relating to the semiconductor laser; and
a step of mounting a memory for storing control data from the laser driver to the semiconductor laser in a manner corresponding to the temperature.

REFERENCE SIGNS LIST

11: Light emitting unit
12: Light receiving unit
13: Light emitting control unit
14: Distance measurement computing unit
19: Distance measurement module
21: Sensor
23: Setting memory
100: Substrate
101: Connection via
109: Setting memory
110: Support plate
120: Adhesive resin layer
130: Peelable copper foil
131: Carrier copper foil 132: Ultra-thin copper foil
140: Solder resist
150: Wiring pattern
161 to 163: Interlayer insulating resin
170 to 172: Via hole
180: Solder resist
200: Laser driver
210: I/O pad
220: Protective insulating layer
230: Surface protective film
240: Adhesion layer and seed layer
250: Photoresist
260: Copper land and copper redistribution layer (RDL)
290: Die attach film (DAF)
300: Semiconductor laser
301: Solder bump
302: Bonding wire
400: Photodiode
500: Passive component
600: Frame
610: Collimator lens
619: Microlens array
620: First optical element
622: Collimator lens
710: Diffraction element
720: Second optical element
800: Electronic equipment
801: Housing
810: Imaging unit
820: Distance measurement module
830: Shutter button
840: Power button
850: Control unit
860: Storage unit
870: Wireless communication unit
880: Display unit
890: Battery

What is claimed is:

1. A semiconductor laser driving apparatus, comprising:
a substrate incorporating a laser driver;
a semiconductor laser mounted on one surface of the substrate to emit irradiation light from an irradiation surface;
connection wiring that electrically connects the laser driver and the semiconductor laser to each other with a wiring inductance of 0.5 nanohenries or less;
a temperature sensor for measuring a temperature relating to the semiconductor laser; and
a memory for storing control data from the laser driver to the semiconductor laser in a manner corresponding to the temperature,
wherein the memory stores, as the control data, a drive current for the semiconductor laser to output a predetermined laser power, and
wherein the laser driver reads the drive current corresponding to the predetermined laser power and corresponding to the temperature measured by the temperature sensor and outputs the read drive current to the semiconductor laser.

2. The semiconductor laser driving apparatus according to claim 1,
wherein the memory stores, as the control data, a drive current for the semiconductor laser to output a predetermined laser power, and
the laser driver reads the drive current corresponding to the predetermined laser power and corresponding to the temperature measured by the temperature sensor and outputs the read drive current to the semiconductor laser.

3. The semiconductor laser driving apparatus according to claim 1,
wherein the memory is mounted on one surface of the substrate.

4. The semiconductor laser driving apparatus according to claim 1,
wherein the memory is incorporated in the substrate.

5. The semiconductor laser driving apparatus according to claim 1,
wherein the memory is mounted inside the laser driver.

6. The semiconductor laser driving apparatus according to claim 1, further comprising:
a first optical element provided on an irradiation surface side of the semiconductor laser; and
a second optical element provided outside the first optical element on the irradiation surface side of the semiconductor laser,
wherein the semiconductor laser includes first and second semiconductor lasers,
the first optical element is an optical element that allows irradiation light from the first semiconductor laser to pass therethrough and makes irradiation light from the second semiconductor laser into parallel light,
the second optical element is a diffusion element that refracts light having passed through the first optical element and a diffraction element that diffracts the parallel light from the first optical element, and
the memory stores control data from the laser driver to the first and second semiconductor lasers in a manner corresponding to the temperature.

7. The semiconductor laser driving apparatus according to claim 1,
wherein the connection wiring has a length of 0.5 millimeters or less.

8. The semiconductor laser driving apparatus according to claim 1,
wherein the connection wiring is provided via a connection via provided in the substrate.

9. The semiconductor laser driving apparatus according to claim 1,
wherein the semiconductor laser is arranged in such a manner that a part thereof overlaps an upper part of the laser driver.

10. The semiconductor laser driving apparatus according to claim 9,
wherein the semiconductor laser is arranged in such a manner that a part corresponding to 50% or less of an area thereof overlaps the upper part of the laser driver.

11. A semiconductor laser driving apparatus, comprising:
a substrate incorporating a laser driver;
a semiconductor laser mounted on one surface of the substrate to emit irradiation light from an irradiation surface;
connection wiring that electrically connects the laser driver and the semiconductor laser to each other with a wiring inductance of 0.5 nanohenries or less;
a temperature sensor for measuring a temperature relating to the semiconductor laser;
a memory for storing control data from the laser driver to the semiconductor laser in a manner corresponding to the temperature;
an outer wall surrounding a region including the semiconductor laser on the one surface of the substrate;

a diffusion plate covering an upper part of the region surrounded by the outer wall; and a photodiode that is mounted on the one surface of the substrate and monitors light intensity of laser light emitted from the semiconductor laser, wherein the memory stores an expected value of a ratio of laser power to the light intensity, as the control data, and wherein the laser driver reads the corresponding expected value from the memory on a basis of the temperature measured by the temperature sensor and controls the semiconductor laser according to a relation between the ratio of the laser power to the light intensity and the read expected value.

12. The semiconductor laser driving apparatus according to claim 11, wherein, in a case where the ratio of the laser power to the light intensity does not satisfy a predetermined range based on the read expected value, the laser driver controls the semiconductor laser such that the laser power increases.

13. The semiconductor laser driving apparatus according to claim 11, wherein, in a case where the ratio of the laser power to the light intensity does not satisfy a predetermined range based on the read expected value, the laser driver performs control to stop the semiconductor laser.

14. Electronic equipment, comprising:

a substrate incorporating a laser driver;

a semiconductor laser mounted on one surface of the substrate to emit irradiation light from an irradiation surface;

a connection wiring that electrically connects the laser driver and the semiconductor laser to each other with a wiring inductance of 0.5 nanohenries or less;

a temperature sensor for measuring a temperature relating to the semiconductor laser; and a memory for storing control data from the laser driver to the semiconductor laser in a manner corresponding to the temperature.

\* \* \* \* \*